United States Patent
Tsutsumi

(10) Patent No.: US 10,491,772 B2
(45) Date of Patent: Nov. 26, 2019

(54) IMAGE FORMING APPARATUS FOR FORMING NEW IMAGE ON RECORDING SURFACE OF SHEET WITH IMAGE PREVIOUSLY FORMED THEREON AND READING APPARATUS FOR SORTING SHEETS WITH IMAGES PREVIOUSLY FORMED THEREON

(71) Applicant: KYOCERA Document Solutions Inc., Osaka (JP)

(72) Inventor: Masafumi Tsutsumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/962,386

(22) Filed: Apr. 25, 2018

(65) Prior Publication Data

US 2018/0316813 A1 Nov. 1, 2018

(30) Foreign Application Priority Data

Apr. 27, 2017 (JP) ................................. 2017-088396

(51) Int. Cl.
*H04N 1/32* (2006.01)
*H04N 1/00* (2006.01)
*H04N 1/23* (2006.01)

(52) U.S. Cl.
CPC ..... *H04N 1/00816* (2013.01); *H04N 1/00005* (2013.01); *H04N 1/00037* (2013.01); *H04N 1/00074* (2013.01); *H04N 1/00082* (2013.01); *H04N 1/2353* (2013.01); *H04N 1/2369* (2013.01)

(58) Field of Classification Search
CPC ........... H04N 1/00816; H04N 1/00005; H04N 1/00037; H04N 1/00074; H04N 1/00082
USPC .................................. 358/1.1, 468, 1.9, 1.18
See application file for complete search history.

(56) References Cited

U.S. PATENT DOCUMENTS 6,478,491 B2 * 11/2002 Nishimura ............. B41J 11/006
400/636
2009/0278882 A1 * 11/2009 Yoshida ................. B41J 2/2135
347/19

FOREIGN PATENT DOCUMENTS

JP 2001-331067 A 11/2001

* cited by examiner

*Primary Examiner* — Douglas Q Tran
(74) *Attorney, Agent, or Firm* — Studebaker & Brackett PC

(57) ABSTRACT

An image forming apparatus forms a second image on a sheet including a previously formed first image. The image forming apparatus includes a reading apparatus, a controller, and an image forming section. The reading apparatus reads the first image to generate first image data. The controller acquires first formation area data indicating an area in which the first image is formed based on the first image data. The image forming section forms a second image on a recording surface of the sheet based on second image data. The controller acquires second formation area data indicating an area in which the second image is to be formed based on the second image data. The controller executes a comparison process to compare the first and second formation area data. The controller determines whether or not to form the second image on the recording surface based on a comparison process result.

8 Claims, 15 Drawing Sheets

IMAGE FORMING APPARATUS FOR FORMING NEW IMAGE ON RECORDING SURFACE OF SHEET WITH IMAGE PREVIOUSLY FORMED THEREON AND READING APPARATUS FOR SORTING SHEETS WITH IMAGES PREVIOUSLY FORMED THEREON

INCORPORATION BY REFERENCE

The present application claims priority under 35 U.S.C. § 119 to Japanese Patent Application No. 2017-0883%, filed on Apr. 27, 2017. The contents of this application are incorporated herein by reference in their entirety.

BACKGROUND

The present disclosure relates to an image forming apparatus and a reading apparatus.

Some users of an image forming apparatus use another side (a reverse surface) of a sheet (hereinafter referred to as a recorded sheet) having an image formed on one side thereof (a recording surface) for effective utilization of resources. As such, various techniques are proposed to support the use of recorded sheets by such users. An image forming apparatus determines a cassette housing the recorded sheets and changes the paper feeding cassette according to whether or not a printing mode is set to simplex printing. The image forming apparatus feeds a recorded sheet from the cassette housing the recorded sheets when the printing mode is set to simplex printing. When the printing mode is set to duplex printing, the image forming apparatus feeds an unused sheet (hereinafter referred to as an unrecorded sheet) from a different cassette than the cassette housing the recorded sheets. That is, the image forming apparatus does not form an image on the recording surface of a recorded sheet.

SUMMARY

A first image forming apparatus according to the present disclosure includes a reading apparatus, a controller, and an image forming section. The reading apparatus reads a first image previously formed on a recording surface of a sheet to generate first image data indicating the first image. The controller acquires first formation area data based on the first image data. The first formation area indicates a range of a first formation area in which the first image is formed. The image forming section forms a second image on the recording surface based on second image data indicating the second image. The controller acquires second formation area data based on the second image data. The second formation area data indicates a range of a second formation area in which the second image is to be formed. The controller executes a comparison process to compare the first formation area data and the second formation area data. The controller determines whether or not to form the second image on the recording surface based on a result of the comparison process.

A reading apparatus according to the present disclosure includes a casing, a reading mechanism, an ejection section, and a controller. The reading mechanism reads an image previously formed on a recording surface of a sheet to generate image data indicating the image. The ejection section ejects the sheet from which the image has been read from the casing. The controller acquires formation area data based on the image data. The formation area data indicates a range of a formation area in which the image is formed. The controller determines Whether or not the range of the formation area is contained within a predetermined range based on the formation area data. The controller directs the ejection section to sort one or more sheets on which the range of the formation area is determined to be contained within the predetermined range from one or more sheets on which the range of the formation area is determined not to be contained within the predetermined range.

A second image forming apparatus according to the present disclosure includes an image forming section, an input section, and a controller. The image forming section forms a second image on a sheet on which a first image is previously formed on a recording surface thereof. The image forming section forms the second image on the recording surface based on second image data indicating the second image. The input section receives input of first formation area data indicating a range of a first formation area in which the first image is formed. The controller acquires the first formation area data through the input section. The controller acquires second formation area data based on the second image data. The second formation area data indicates a range of a second formation area in which the second image is to be formed. The controller executes a comparison process to compare the first formation area data and the second formation area data. The controller determines whether or not to form the second image on the recording surface based on a result of the comparison process.

DETAILED DESCRIPTION

Figure 1:
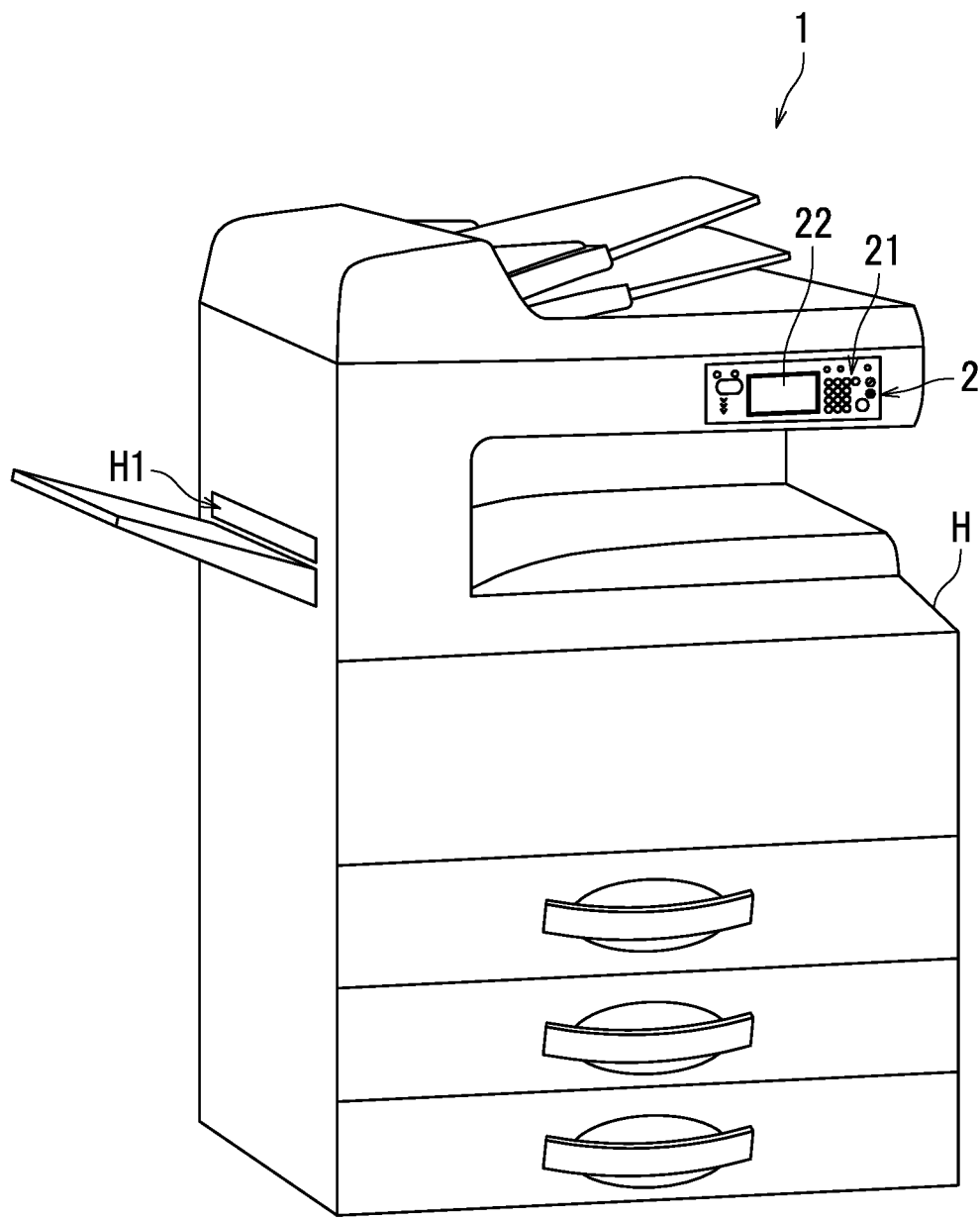
FIG. 1 is a diagram illustrating an outer appearance of an image forming apparatus according to a first embodiment of the present disclosure.

Embodiments of an image forming apparatus and a reading apparatus according to an aspect of the present disclosure will be described as follows with reference to the drawings. It should be noted that elements in the drawings that are the same or equivalent are labelled using the same reference signs and description thereof is not repeated. The drawings are schematic illustrations that emphasize elements of configuration in order to facilitate understanding thereof.

First Embodiment

First, a configuration of an image forming apparatus 1 according to a first embodiment of the present disclosure will be described with reference to FIGS. 1 to 3. FIG. 1 is a diagram illustrating an outer appearance of the image forming apparatus 1 according to the first embodiment. The image forming apparatus 1 is a multifunction peripheral, for example.

According to the present embodiment, the image forming apparatus 1 determines whether or not an image can be additionally formed on a sheet on which an image is previously formed, based on an instruction from a user. In the following, the sheet on which an image is previously formed will be referred to as a "recorded sheet". Also, the image that is previously formed on the recorded sheet will be referred to as a "first image". The first image is formed on only one side of the recorded sheet. In the following, the side of the recorded sheet on which the first image is formed will be referred to as a "recording surface". According to the present embodiment, the image forming apparatus 1 determines whether or not an image can be formed on the recording surface of the recorded sheet based on the instruction from the user when a printing mode is a duplex printing mode. In the following, the image determined whether or not to be formable on the recording surface will be referred to as a "second image". According to the present embodiment, the first and second images include character images. The character images display characters. The image forming apparatus 1 forms the second image on the recording surface of the recorded sheet when determining that the second image can be formed on the recording surface of the recorded sheet.

The image forming apparatus 1 can also form the image based on the instruction from the user on an unused sheet. In the following, the unused sheet will be referred to as an "unrecorded sheet". Note that the recorded and unrecorded sheets are plain paper or thick paper, for example.

As illustrated in FIG. 1, the image forming apparatus 1 includes a main body H and an operation section 2. The main body H includes a first main body exit port H1.

The operation section 2 receives an instruction from the user for the image forming apparatus 1. The operation section 2 generates a signal indicating the instruction from the user when the instruction from the user is received. According to the present embodiment, the user can operate the operation section 2 to instruct (specify) a function to be executed by the image forming apparatus 1. The functions of the image forming apparatus 1 include a sorting function, a copy function, and a printing function. Note that according to the present embodiment, the sorting function sorts a plurality of recorded sheets into two categories: recorded sheets fulfilling a predetermined condition and recorded sheets not fulfilling the predetermined condition.

The user can instruct the image forming apparatus 1 to start processing in each function by operating the operation section 2. According to the present embodiment, the user can issue a sheet reading start instruction and an image formation start instruction to the image forming apparatus 1. The sheet reading start instruction is to start reading of an image formed on a sheet. The image formation start instruction is to start formation of an image on a sheet. The image formation start instruction includes a printing mode instruction to indicate a printing mode and a sheet assortment instruction to indicate an assortment of sheets to be used. The printing mode instruction indicates whether an image is to be formed on a single side or both sides of a sheet. The sheet assortment instruction indicates whether to use a recorded sheet or an unrecorded sheet.

The image forming apparatus 1 operates in a duplex printing mode when the printing mode instruction indicates that an image is to be formed on both sides of a sheet. By contrast, the image forming apparatus 1 operates in a simplex printing mode when the printing mode instruction indicates that an image is to be formed on a single side of a sheet.

The operation section 2 includes a plurality of operation keys 21 and a touch panel 22. The operation keys 21 include a numeric keypad and a start key, for example. The user can input an instruction for the image forming apparatus 1 by operating the operation keys 21. The touch panel 22 displays various information. The user can also input an instruction for the image forming apparatus 1 by touching a touch surface included in the touch panel 22.

Continuing, the configuration of the image forming apparatus 1 according to the first embodiment will be described in detail with reference to FIG. 2. FIG. 2 is a diagram illustrating the configuration of the image forming apparatus 1 according to the first embodiment.

Figure 2:
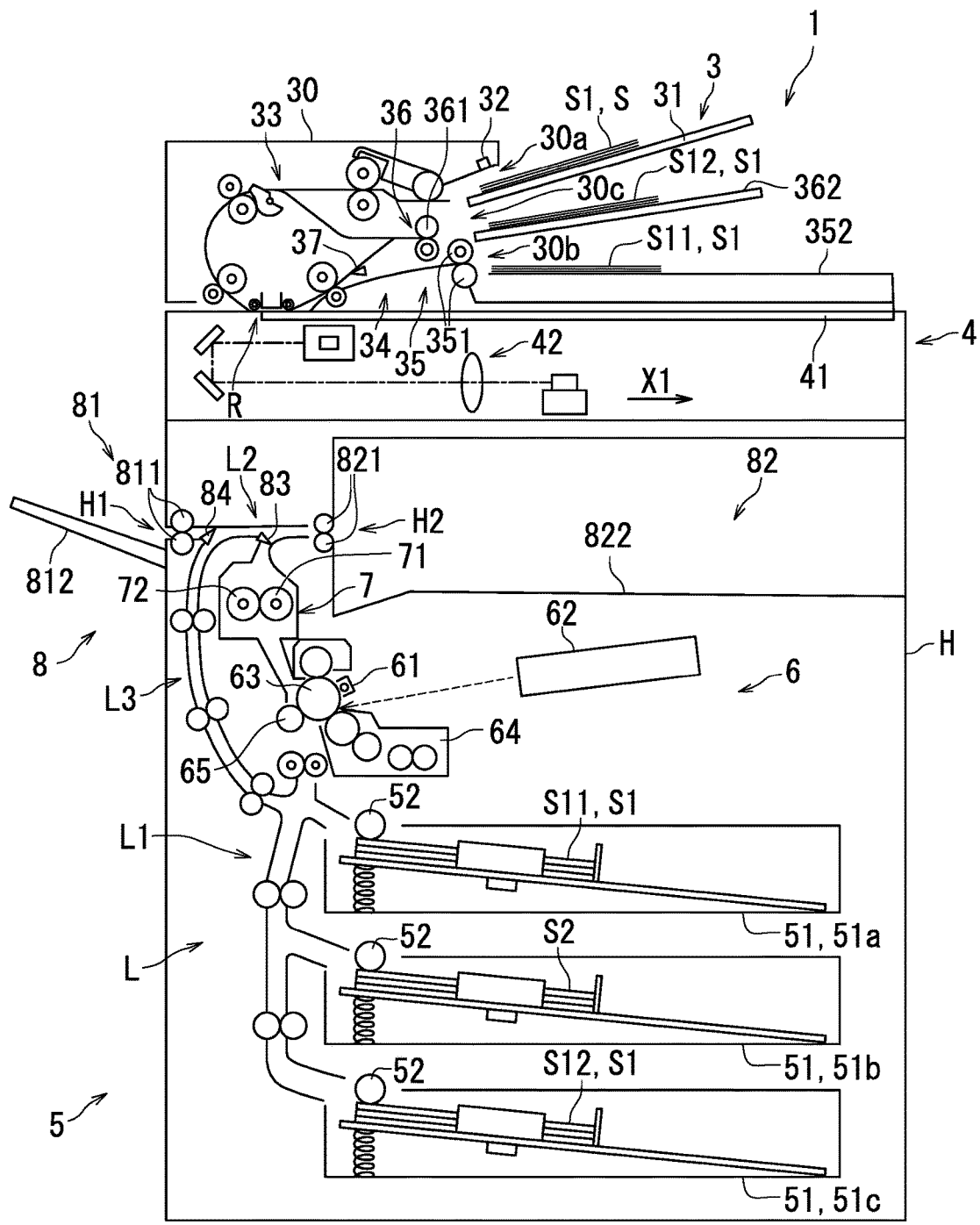
FIG. 2 is a diagram illustrating a configuration of the image forming apparatus according to the first embodiment of the present disclosure.

As illustrated in FIG. 2, the image forming apparatus 1 further includes a document feeder 3, a reading apparatus 4, a sheet feed section 5, an image forming section 6, a fixing device 7, an ejection section 8, and a conveyor device L.

The document feeder 3 includes a casing 30, a document table 31, a sheet detection sensor 32, a document conveyance section 33, and a document ejection section 34. The casing 30 includes a document conveyance inlet 30a, a first document exit port 30b, and a second document exit port 30c.

The sheet detection sensor 32 is a through-beam sensor, for example. The sheet detection sensor 32 generates a signal indicating that one or more sheets S are placed on the document table 31.

The document conveyance section 33 conveys the sheets S placed on the document table 31 to the document ejection section 34. In detail, the document conveyance section 33 conveys the sheets S to the document ejection section 34 through a reading position R. In the reading position R, the reading apparatus 4 can read an image formed on a sheet S. The document conveyance section 33 conveys the sheets S placed on the document table 31 a sheet at a time to the document ejection section 34. The document ejection section 34 ejects the sheets S conveyed by the document conveyance section 33 out of the casing 30.

When the sorting function is executed, a plurality of recorded sheets S1 is placed on the document table 31. The document conveyance section 33 conveys the recorded sheets S1 a sheet at a time to the reading position R such that the recording surfaces thereof face the reading position R. The document conveyance section 33 conveys the recorded sheets S1 that have passed the reading position R to the document ejection section 34. The document ejection section 34 ejects the recorded sheets S1 out of the casing 30.

The document ejection section 34 includes a first document ejection section 35, a second document ejection section 36, and a first diverging guide 37. The first diverging guide 37 is pivotably supported. The first diverging guide 37 switches the conveyance destination of the recorded sheets S1 between the first document ejection section 35 and the second document ejection section 36 by pivoting when the sorting function is executed. In detail, the first diverging guide 37 guides a recorded sheet S1 fulfilling the predetermined condition to the first document ejection section 35 and guides a recorded sheet S1 not fulfilling the predetermined condition to the second document ejection section 36 by pivoting. As a result, the recorded sheet S1 fulfilling the predetermined condition is conveyed to the first document ejection section 35 and the recorded sheet S1 not fulfilling the predetermined condition is conveyed to the second document ejection section 36. In the following, the recorded sheets S1 conveyed to the first document ejection section 35 will be referred to as "first recorded sheets S11" and the recorded sheets S1 conveyed to the second document ejection section 36 will be referred to as "second recorded sheets S12". A first image on the recording surface of each first recorded sheet S11, for example, is comparatively small in area. Therefore, the first image on each first recorded sheet S11 tends not to reduce readability of other images that are additionally formed on the recording surface of the first recorded sheet S11. A first image on the recording surface of each second recorded sheet S12, for example, is comparatively large in area. Therefore, the second image on each second recorded sheet S12 tends to reduce readability of other images that are additionally formed on the recording surface of the second recorded sheet S12.

The first document ejection section 35 includes first document ejection rollers 351 and a first document ejection table 352. The first document ejection rollers 351 eject the first recorded sheets S11 out of the casing 30 through the first document exit port 30b when the sorting function is executed. The first recorded sheets S11 ejected from the first document exit port 30b are placed on the first document ejection table 352.

The second document ejection section 36 includes second document ejection rollers 361 and a second document ejection table 362. The second document ejection rollers 361 eject the second recorded sheets S12 out of the casing 30 through the second document exit port 30c during the execution of the sorting function. The second recorded sheets S12 ejected from the second document exit port 30c are placed on the second document ejection table 362.

The first diverging guide 37 also pivots when images are read from both sides of a sheet S during execution of the copy function, for example. In detail, the first diverging guide 37 guides a sheet S from which an image formed on a first side thereof has been read to the second document ejection section 36. As a result, the sheet S from which the image formed on the first side thereof has been read is conveyed to the second document ejection section 36. The sheet S conveyed to the second document ejection section 36 is switched back by the second document ejection rollers 361. Specifically, the second document ejection rollers 361 convey the sheet S toward the document conveyance section 33 by rotating in reverse after ejecting a portion of the sheet S out of the casing 30 by rotating forward. As a result, the switched-back sheet S is conveyed to the document conveyance section 33. The document conveyance section 33 reconveys the switched-back sheet S to the document ejection section 34 by way of the reading position R. Thus, an image formed on a second side of the sheet S is read.

The first diverging guide 37 guides the sheet S from which the image formed on the second side thereof has been read to the first document ejection section 35. As a result, the sheet S is conveyed to the first document ejection section 35. The first document ejection rollers 351 eject the sheet S conveyed to the first document ejection section 35 out of the casing 30 through the first document exit port 30b. As a result, the sheet S from which images formed on both sides thereof have been read is placed on the first document ejection table 352.

The reading apparatus 4 is a scanner, for example. The reading apparatus 4 generates image data by reading the image formed on a sheet S.

The reading apparatus 4 includes contact glass 41 and a reading mechanism 42. The contact glass 41 is located in an upper portion of the reading apparatus 4 and faces a lower surface of the document feeder 3. The reading mechanism 42 includes a carriage, an optical system, and an image sensor. The carriage moves a light source in a sub-scanning direction X1. The light source radiates light to a sheet S placed on the contact glass 41 while moving in the sub-scanning direction X1. Alternatively, the light source radiates a sheet S passing the reading position R. The optical system guides light reflected from the sheet S to the image sensor. The image sensor converts the light guided by the optical system to an electrical signal and outputs the electrical signal. The reading apparatus 4 generates image data based on the output of the image sensor. According to the present embodiment, the reading apparatus 4 reads the first image formed on the recording surface of a recorded sheet S1 passing the reading position R to generate first image data.

The sheet feed section 5 feeds sheets S a sheet at a time to the image forming section 6. The sheet feed section 5 includes three cassettes 51 and three sheet feed rollers 52. Each of the cassettes 51 houses a plurality of sheets S. Each of the sheet feed rollers 52 is installed in a corresponding cassette 51 and feeds an uppermost sheet S among the sheets S housed in the cassette 51 to the image forming section 6. In the following, an uppermost cassette 51 of the three cassettes 51 will be referred to as a "first cassette 51a". A middle-positioned cassette 51 will be referred to as a "second cassette 51b." A lowermost cassette 51 will be referred to as a "third cassette 51c". The cassette 51 to feed the sheets S is determined according to the printing mode instruction and the sheet assortment instruction.

The first recorded sheets S11 are housed in the first cassette 51a. In detail, the first recorded sheets S11 are housed in the first cassette 51a such that the second image is to be formed on the recording surfaces thereof. The first recorded sheets S11 are also housed in the first cassette 51a such that the second image is to be formed upside down relative to the first image. According to the present embodiment, the first recorded sheets S11 housed in the first cassette 51a are fed when the printing mode instruction indicates that an image is to be formed on both sides of a sheet S and the sheet assortment function indicates that the recorded sheets S1 are to be used. According to the present embodiment, a second image is to be formed on a second side in duplex printing.

Unrecorded sheets S2 are housed in the second cassette 51b. The unrecorded sheets S2 are fed when the sheet assortment instruction indicates that the unrecorded sheets S2 are to be used. The unrecorded sheets S2 are also fed when the second image cannot be formed on the recording surfaces of the first recorded sheets S11.

The second recorded sheets S12 are housed in the third cassette 51c. The second recorded sheets S12 are housed in the third cassette 51c such that an image is to be formed on reverse surfaces opposite the recording surfaces. The second recorded sheets S12 housed in the third cassette 51c are fed when the printing mode instruction indicates that an image is to be formed on a single side of a sheet S and the sheet assortment function indicates that recorded sheets S1 are to be used.

The image forming section 6 forms an image on a sheet S based on image data. The image forming section 6 includes a charger 61, an exposure device 62, a photosensitive drum 63, a developing device 64, and a transfer roller 65. The charger 61 charges the photosensitive drum 63 to a predetermined potential. The exposure device 62 radiates light on to the photosensitive drum 63 based on the image data. As such, an electrostatic latent image is formed on the surface of the photosensitive drum 63. The developing device 64 supplies toner to the photosensitive drum 63. As a result, the electrostatic latent image formed on the photosensitive drum 63 is developed to form a toner image. The transfer roller 65 transfers the toner image formed on the photosensitive drum 63 to the sheet S.

The fixing device 7 includes a heat member 71 and a pressure member 72. The heat member 71 and the pressure member 72 are located opposite each other and form a fixing nip. The sheet S conveyed from the image forming section 6 is heated and pressed by passing through the fixing nip. As a result, the toner image is fixed to the sheet S. The sheet S with the toner image fixed thereon is conveyed from the fixing device 7 toward the ejection section 8 by the conveyor device L.

The ejection section 8 includes a first ejection section 81, a second ejection section 82, a second diverging guide 83, and a third diverging guide 84.

The first ejection section 81 includes first ejection rollers 811 and a first ejection table 812. The first ejection rollers 811 eject the sheet S out of the main body H through the first main body exit port H1. The sheet S ejected from the first main body exit port H1 is placed on the first ejection table 812.

The second ejection section 82 includes second ejection rollers 821 and a second ejection table 822. The second ejection rollers 821 eject the sheet S out of the main body H from a second main body exit port H2 formed on the main body H. The sheet S ejected from the second main body exit port H2 is placed on the second ejection table 822.

The conveyor device L conveys the sheet S fed from the sheet feed section 5 to the ejection section 8. The conveyor device L includes a plurality of conveyance rollers and guides. The conveyor device L includes a first conveyance section L1, a second conveyance section L2, and a third conveyance section L3.

The first conveyance section L1 extends from the sheet feed section 5 to the second diverging guide 83. The second conveyance section L2 extends from the second diverging guide 83 to the third diverging guide 84. The third conveyance section L3 extends from the third diverging guide 84 to the first conveyance section L1. The third conveyance section L3 is used when operating in the duplex printing mode. In detail, a switched-back sheet S is conveyed through the third conveyance section L3. Specifically, the second ejection rollers 821 convey the sheet S toward the third diverging guide 84 by rotating in reverse after ejecting a portion of the sheet S out of the main body H by rotating forward. As a result, the sheet S is switched back. The third conveyance section L3 conveys the switched-back sheet S to a position further upstream than the image forming section 6 in a conveyance direction of the sheet S.

The second diverging guide 83 and the third diverging guide 84 are pivotably supported. The second diverging guide 83 switches the conveyance destination of the sheet S between the second ejection section 82 and the second conveyance section L2 by pivoting. The third diverging guide 84 switches the conveyance destination of the sheet S between the first ejection section 81 and the third conveyance section L3 by pivoting.

Continuing, the configuration of the image forming apparatus 1 according to the first embodiment will be further described with reference to FIG. 3. FIG. 3 is a block diagram illustrating the configuration of the image forming apparatus 1 according to the first embodiment.

Figure 3:
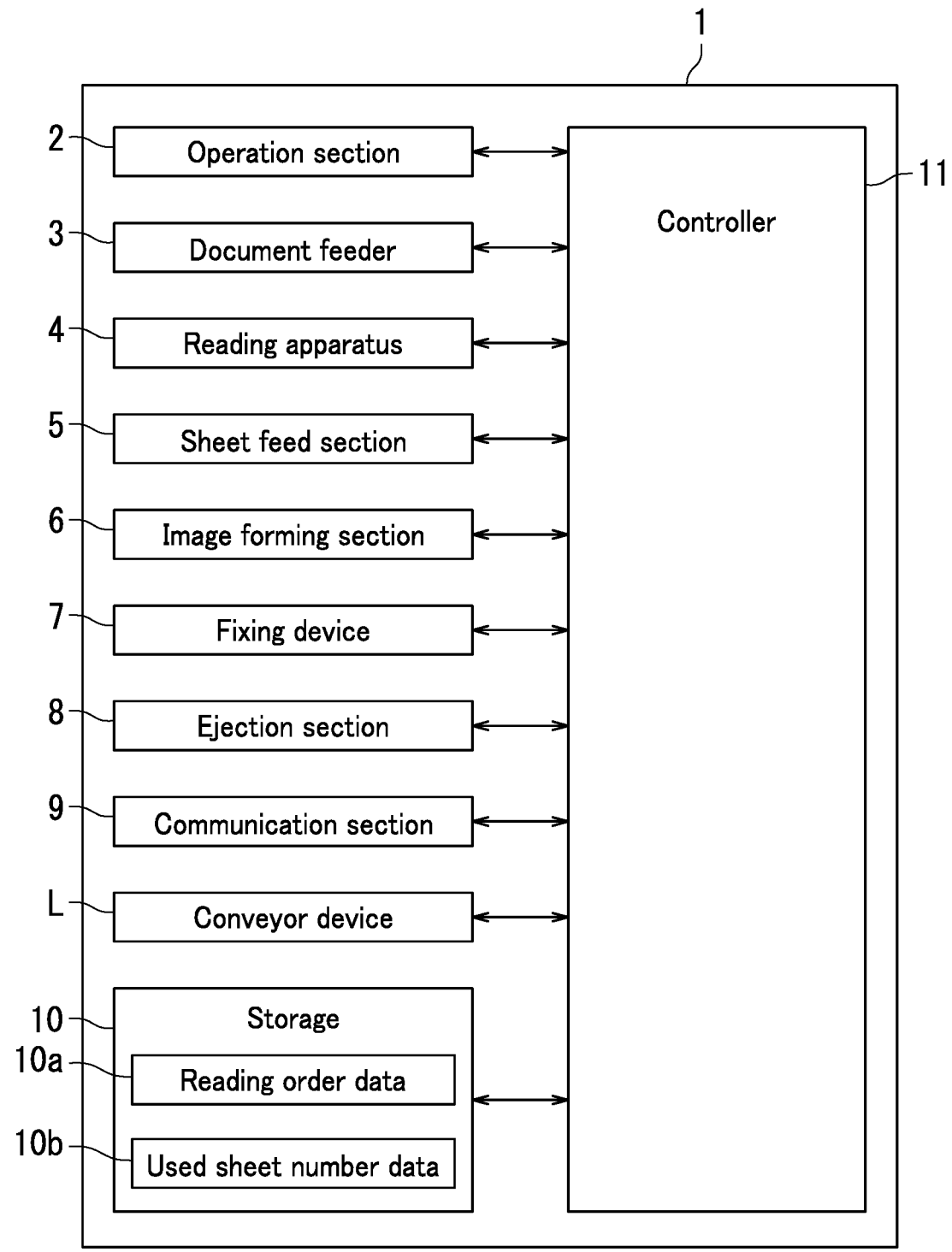
FIG. 3 is a block diagram illustrating the configuration of the image forming apparatus according to the first embodiment of the present disclosure.

As illustrated in FIG. 3, the image forming apparatus 1 further includes a communication section 9, storage 10, and a controller 11.

The communication section 9 connects to an information processing device through a network such as the Internet. An example of the information processing device is a personal computer used by the user. The communication section 9 is a network interface such as a local area network (LAN) adapter. When the printing function is executed, the user can instruct the image forming apparatus 1 to form an image by operating the information processing device. The communication section 9 receives a signal indicating an image formation start instruction (printing mode instruction and sheet assortment instruction) and image data indicating an image from the information processing device. When the printing mode instruction indicates that an image is to be formed on both sides of a sheet S, the image data includes second image data indicating a second image.

The storage 10 includes a storage medium such as a hard-disk drive (HDD), random-access memory (RAM), or read-only memory (ROM). The storage 10 stores a control program for controlling operation of each section of the image forming apparatus 1. The control program is executed by the controller 11.

According to the present embodiment, the storage 10 stores first image data generated by the reading apparatus 4 in association with data indicating a reading order. The reading order indicates an order in which the first images of the first recorded sheets S11 are read by the reading apparatus 4 when the sorting function is executed. In the following, the data indicating the reading order will be referred to as "reading order data 10a".

Data indicating a number of used sheets is stored in the storage 10. The number of used sheets is the number of first recorded sheets S11 fed from the first cassette 51a by the sheet feed section 5. In the following, the data indicating the number of used sheets will be referred to as "used sheet number data 10b".

Example components of the controller 11 include a central processing unit (CPU) and an application-specific integrated circuit (ASIC). The controller 11 receives data and signals from each section of the image forming apparatus 1. The controller 11 also controls operation of each section of the image forming apparatus 1.

The controller 11 executes an image reading process when a signal indicating the sheet reading start instruction is received from the operation section 2 during the execution of the sorting function. In the image reading process during the execution of the sorting function, the controller 11 acquires data indicating a range of a first formation area in which the first image is formed, based on the first image data. In the following, the data indicating the range of the first formation area will be referred to as "first formation area data". Furthermore, an area other than the first formation area within the recording surface of a recorded sheet S1 will be referred to as a "blank area".

The controller 11 acquires the first formation area data using an optical character recognition (OCR) function, for example. Specifically, the data indicating the range in which the first image is formed (the range of the first formation area) and data indicating the range of the area other than the range of the first formation area the blank area) are generated by the OCR function. The controller 11 acquires the first formation area data based on the data generated by the OCR function. Alternatively, the controller 11 acquires the first formation area data based on data indicating luminance values obtained by scanning a recording surface. Specifically, the controller 11 determines that dots with a luminance value of "0" constitute a blank area when the dots are continuous by at least a predetermined number. The controller 11 determines the area other than the blank area to be the first formation area. Note that the predetermined number for determining the blank area is preset.

Also in the image reading process during the execution of the sorting function, the controller 11 determines whether or not a recorded sheet S1 fulfills the predetermined condition based on the first formation area data. In other words, the controller 11 determines whether the recorded sheet S1 is either a first recorded sheet S11 or a second recorded sheet S12. The controller 11 stores in the storage 10 the first formation area data in association with the reading order data 10a when the controller 11 has determined that the recorded sheet S1 fulfills the predetermined condition (the recorded sheet S1 is a first recorded sheet S11).

Next, operation of the image forming apparatus 1 during the execution of the sorting function according to the first embodiment will be described with reference to FIGS. 2 to 5.

Figure 4A:
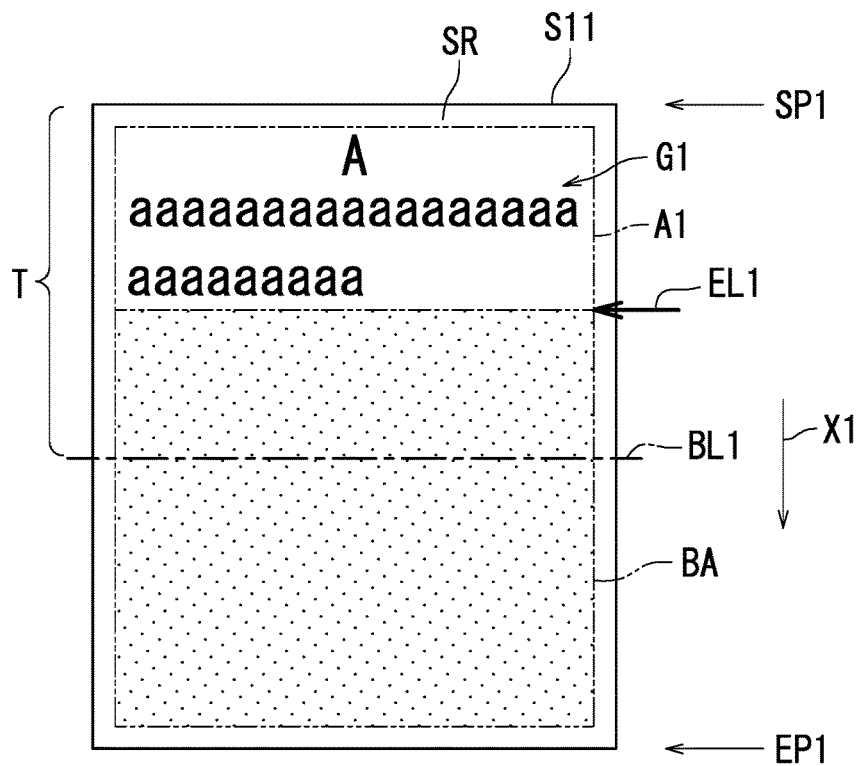
FIG. 4A is a diagram illustrating an example of a recording surface of a first recorded sheet according to the first embodiment of the present disclosure.

First, the recorded sheets S1 according to the first embodiment will be described with reference to FIGS. 2 to 4A and 4B. FIG. 4A is a diagram illustrating an example of a recording surface SR of a first recorded sheet S11 according to the first embodiment of the present disclosure. A position SP1 illustrated in FIGS. 4A and 4B indicates a scan starting line SP1 in the sub-scanning direction X1 when the reading apparatus 4 reads an image. A position EP1 indicates a scan finish line EP1 in the sub-scanning direction X1 when the reading apparatus 4 reads an image. In the following, the sub-scanning direction X1 when the reading apparatus 4 reads an image will be referred to as a "first sub-scanning direction X1". Also, the scan starting line SP1 in the first sub-scanning direction X1 will be referred to as a "first scan starting line SP1". The scan finish line EP1 in the first sub-scanning direction X1 will be referred to as a "first scan finish line EP1".

Figure 4B:
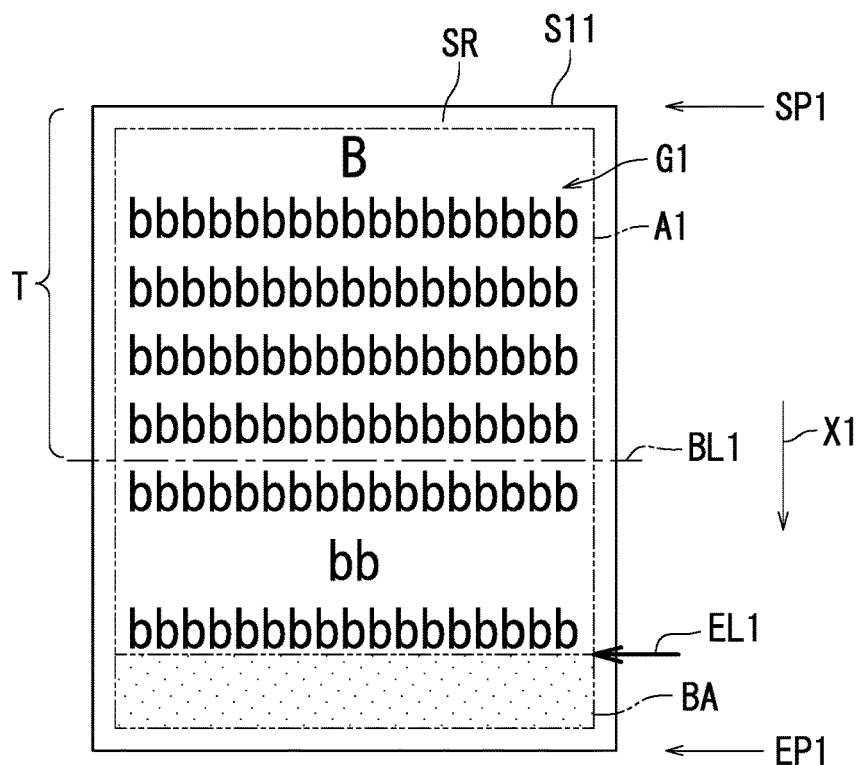
FIG. 4B is a diagram illustrating an example of a recording surface of a second recorded sheet according to the first embodiment of the present disclosure.

A range T illustrated in FIGS. 4A and 4B exhibits a predetermined range T. The predetermined range T is set for a first formation area A1 and prestored in the storage 10. The predetermined range T extends from the first scan starting line SP1 in the first sub-scanning direction X1. A dashed and double dotted line SP1 illustrated in FIGS. 4A and 4B indicates an end point line BL1 of the predetermined range T (hereinafter referred to as a first threshold line BL1). The first threshold line BL1 corresponds to a scan line centrally located between the first scan starting line SP1 and the first scan finish line EP1 in the first sub-scanning direction X1, for example.

As illustrated in FIG. 4A, the recording surface SR includes the first formation area A1 and a blank area BA. The first formation area A1 is a rectangular-shaped area encompassing an area in which a first image G1 is formed (circumscribing the first image G1). The blank area BA does not include an image.

The first formation area A1 and the blank area BA are adjacent to each other in the first sub-scanning direction X1. In detail, the first formation area. A1 extends from the first scan starting line SP1 in the first sub-scanning direction X1. The blank area BA extends from an edge EL1 (hereinafter referred to as a first end point line EL1) to the first scan finish line EP1 in the first sub-scanning direction X1. The first end point line EL1 is on the opposite side of the first formation area A1 from the first scan starting line SP1.

As illustrated in FIG. 4A, the first end point line EL1 of the first formation area A1 on the first recorded sheet S11 is closer to the first scan starting line SP1 than the first threshold line BL1. That is, the first formation area A1 illustrated in FIG. 4A is contained within the predetermined range T. The controller 11 determines that a recorded sheet S1 fulfills the predetermined condition (the recorded sheet S1 is a first recorded sheet S11) when the controller 11 has determined that the first formation area. A1 is contained within the predetermined range T. As such, the first formation area data indicating the range of the first formation area A1 is stored in the storage 10. According to the present embodiment, the controller 11 stores the first end point line EL1 of the first formation area A1 in the storage 10 as the first formation area data.

FIG. 4B is a diagram illustrating an example of a recording surface SR of a second recorded sheet 512 according to the first embodiment of the present disclosure.

Differing from the first formation area A1 illustrated in FIG. 4A, the first end point line EL1 of the first formation area A1 on the second recorded sheet S12 is farther from the scan starting line SP1 than the first threshold line BL1. That is, the first formation area A1 illustrated in FIG. 4B is not contained within the predetermined range T. The controller 11 determines that a recorded sheet S1 does not fulfill the predetermined condition (the recorded sheet S1 is a second recorded sheet S12) when the controller 11 has determined that the first formation area A1 is not contained within the predetermined range T. As such, the controller 11 does not store the first formation area data indicating the range of the first formation area A1 in the storage 10.

Figure 5:
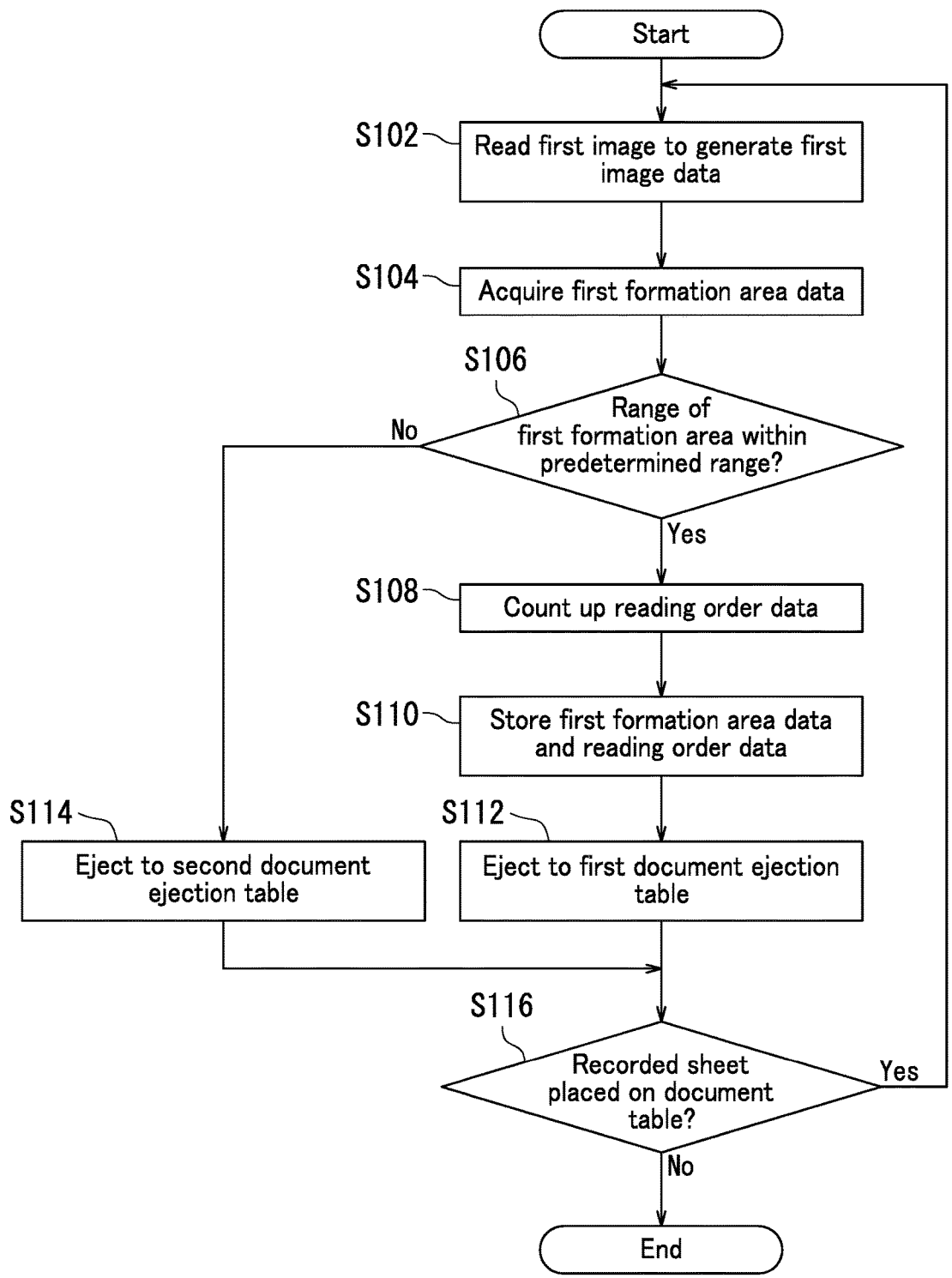
FIG. 5 is a flowchart illustrating an image reading process when a sorting function is executed according to the first embodiment of the present disclosure.
Figure 6:
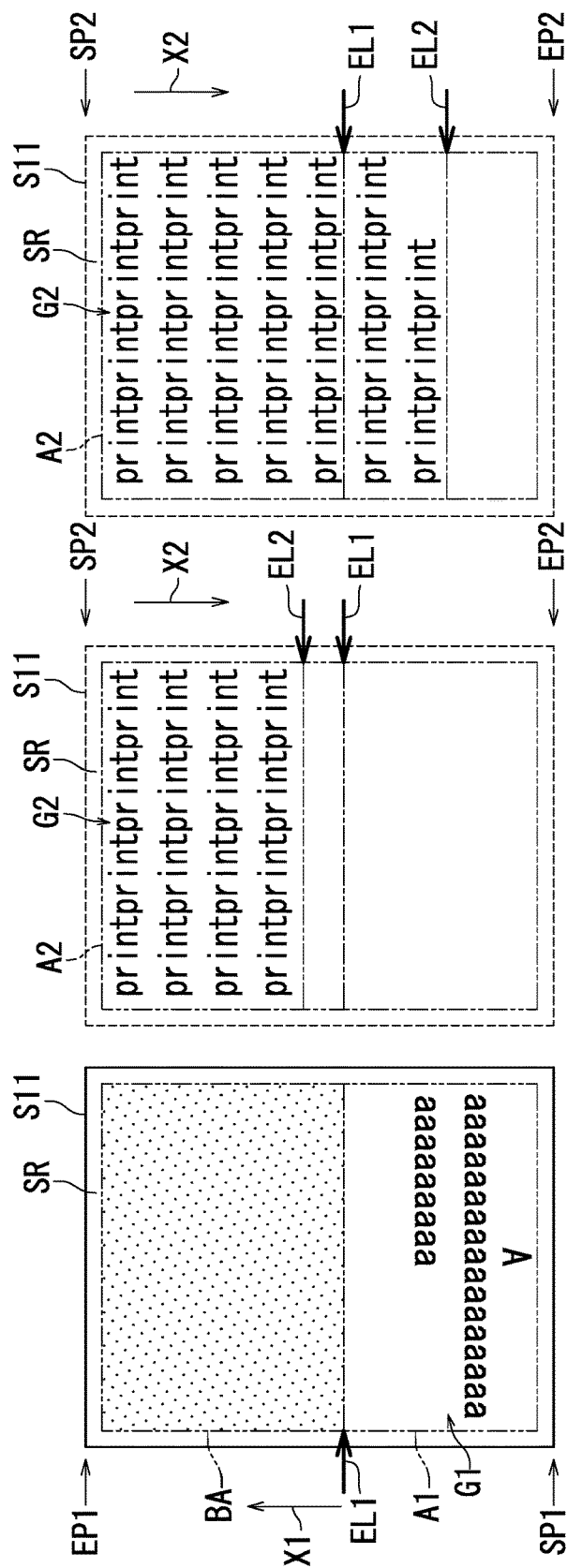
FIG. 6A is a diagram illustrating the recording surface of the first recorded sheet illustrated in FIG. 4A.
FIG. 6B is a diagram illustrating an example of a second image according to the first embodiment of the present disclosure.
FIG. 6C is a diagram illustrating another example of a second image according to the first embodiment of the present disclosure.

Continuing, the image reading process during the execution of the sorting function according to the first embodiment will be described with reference to FIGS. 2 to 5. FIG. 5 is a flowchart illustrating the image reading process during the execution of the sorting function according to the first embodiment. The image reading process during the execution of the sorting function is started when the controller 11 receives a signal indicating the sheet read start instruction from the operation section 2.

As illustrated in FIG. 5, the controller 11 directs the reading apparatus 4 to read the first image G1 formed on the recording surface SR of a recorded sheet S1 to generate the first image data (Step S102). According to the present embodiment, the controller 11 controls operation of the document feeder 3 to convey the recorded sheet S1 placed on the document table 31. The reading apparatus 4 reads the first image G1 formed on the recording surface SR of the recorded sheet S1 conveyed to the reading position R and generates the first image data. The generated first image data is sent to the controller 11. The controller 11 acquires the first formation area data when the first image data is received (Step S104).

Next, the controller 11 determines whether or not the range of the first formation area A1 is contained within the predetermined range T (Step S106). When the controller 11 has determined that the range of the first formation area A1 is contained within the predetermined range T (Step S106: Yes), the controller 11 counts up the reading order data 10a (Step S108). Next, the controller 11 stores the reading order data 10a in association with the first formation area data in the storage 10 (Step S110). Continuing, the controller 11 pivots the first diverging guide 37 so as to convey the recorded sheet S1 to the first document ejection section 35. As a result, the recorded sheet S1 (first recorded sheet S11) is ejected to the first document ejection table 352 (Step S112).

When the controller 11 has determined that the range of the first formation area A1 is not contained within the predetermined range T by contrast (Step S106: No), the controller 11 pivots the first diverging guide 37 so as to convey the recorded sheet S1 to the second document ejection section 36. As a result, the recorded sheet S1 (second recorded sheet S12) is ejected to the second document ejection table 362 (Step 114).

When the process of Step S112 or Step S114 has finished, the controller 11 determines whether or not a recorded sheet S1 is placed on the document table 31 (Step 116). In detail, the controller 11 determines whether or not a recorded sheet S1 is placed on the document table 31 based on a signal generated by the sheet detection sensor 32. When the controller 11 has determined that a recorded sheet S1 is placed on the document table 31 (Step S116: Yes), the image reading process returns to Step S102, When the controller 11 has determined that a recorded sheet S1 is not placed on the document table 31 by contrast (Step S116: No), the image reading process ends. Note that the order of Step S110 and Step S112 is interchangeable.

The reading order data 10a is reset to a starting value of "0" when the image reading process has ended.

When the image reading process has ended, the user houses a plurality of the first recorded sheets S11 that have been ejected to the first document ejection table 352 in the first cassette 51a. In detail, the first recorded sheets S11 are housed in the first cassette 51a in the order in which the first recorded sheets S11 were ejected to the first document ejection table 352. The user also houses a plurality of the second recorded sheets S12 that have been ejected to the second document ejection table 362 in the third cassette 51c.

Next, the operation of the image forming apparatus 1 during execution of the printing function according to the first embodiment will be described with reference to FIGS. 1 to 4B and 6A to 8.

The controller 11 illustrated in FIG. 3 determines whether to operate in either the duplex printing mode or the simplex printing mode based on the printing mode instruction when image data and a signal indicating the image formation start instruction are received from the communication section 9. The controller 11 also determines whether to use either recorded sheets S1 or unrecorded sheets S2 based on the sheet assortment instruction. The controller 11 acquires data indicating a range of a second formation area when the printing mode instruction indicates that an image is to be formed on both sides of a sheet S and the sheet assortment instruction indicates that a recorded sheet S1 is to be used. In detail, the controller 11 acquires data indicating the range of the second formation area based on second image data including the image data received by the communication section 9. The second formation area indicates an area in which the second image is to be formed. In the following, the data indicating the range of the second formation area will be referred to as "second formation area data". The second formation area data is acquired using an OCR function as in the case of the first formation area data. Alternatively, the second formation area data is acquired based on data indicating luminance values obtained by scanning the second image.

The controller 11 also acquires the first formation area data stored in the storage 10. In detail, the controller 11 acquires the first formation area data of the uppermost first recorded sheet S11 among the plurality of first recorded sheets S11 housed in the cassette 51a, based on the reading order data 10a. The controller 11 executes a comparison process when the first formation area data and the second formation area data have been acquired. Specifically, the controller 11 compares the first formation area data with the second formation area data. The controller 11 determines whether or not an image is to be formed on the uppermost first recorded sheet S11 among the plurality of first recorded sheets S11 housed in the first cassette 51a based on a result of the comparison process.

Next, a second formation area A2 will be described with reference to FIGS. 3, 4A, and 6A to 6C. FIG. 6A is a diagram illustrating a recording surface SR of a first recorded sheet S11. In detail, FIG. 6A illustrates the recording surface SR of the uppermost first recorded sheet S11 among the plurality of recorded sheets S11 housed in the first cassette 51a. FIG. 6B is a diagram illustrating an example of a second image G2 according to the first embodiment. FIG. 6C is a diagram illustrating another example of the second image G2 according to the first embodiment. Note that the first recorded sheet S11 illustrated in FIG. 6A is the same as the first recorded sheet S11 illustrated in FIG. 4A. However, the first sub-scanning direction X1 is illustrated inversely as compared to the first recorded sheet S11 illustrated in FIG. 4A. Also, the first recorded sheet S11 is illustrated with dotted lines in FIGS. 6B and 6C for ease of understanding.

A position SP2 illustrated in FIGS. 6B and 6C indicates a scan starting line SP2 in a sub-scanning direction X2 when the second image G2 undergoes image processing. A position EP2 indicates a scan finish line EP2 in the sub-scanning direction X2 when the second image G2 undergoes image processing. In the following, the sub-scanning direction X2 during image processing will be referred to as a "second sub-scanning direction X2". Also, the scan starting line SP2 in the second sub-scanning direction X2 will be referred to as a "second scan starting line SP2". The scan finish line EP2 in the second sub-scanning direction X2 will be referred to as a "second scan finish line EP2".

As illustrated in FIGS. 6B and 6C, the second formation area A2 is a rectangular-shaped area encompassing the second image G2 (circumscribing the second image G2). The second formation area A2 extends from the second scan starting line SP2 in the second sub-scanning direction X2.

The controller 11 acquires an edge EL2 (hereinafter referred to as a second end point line EL2) as the second formation area data based on the second image data when the second image data has been acquired. The second end point line EL2 is on the opposite side of the second formation area A2 from the second scan starting line SP2.

In the example illustrated in FIG. 6B, the second end point line EL2 is closer to the second scan starting line SP2 than the first end point line EL1. In other words, the second formation area A2 is located inside of the blank area BA of the first recorded sheet S11, and does not overlap with the first formation area A1. As such, the controller 11 determines to form an image on the uppermost first recorded sheet S11 among the plurality of first recorded sheets S11 housed in the first cassette 51a.

By contrast, the second end point line EL2 of the second formation area A2 illustrated in FIG. 6C is farther from the second scan starting line SP2 than the first end point line EL1. In other words, a portion of the second formation area A2 is outside of the blank area BA of the first recorded sheet S11 and overlaps with the first formation area A1. As such, the controller 11 determines not to form an image on the uppermost first recorded sheet S11 among the plurality of first recorded sheets S11 housed in the first cassette 51a.

Figure 7:
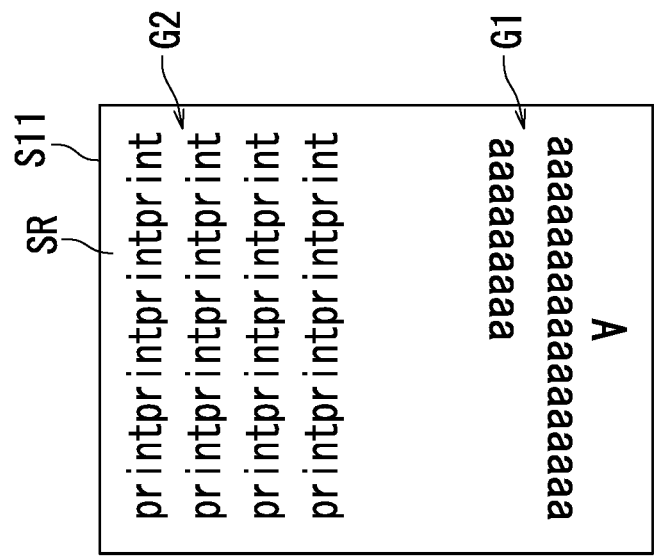
FIG. 7 is a diagram illustrating an example of a recording surface of a first recorded sheet on which a second image is formed according to the first embodiment of the present disclosure.

Continuing, a first recorded sheet S11 with the second image G2 formed on the recording surface SR thereof will be described with reference to FIG. 7. FIG. 7 is a diagram illustrating an example of the recording surface SR of the first recorded sheet S11 with the second image G2 formed thereon. In detail, FIG. 7 illustrates the first recorded sheet S11 illustrated in FIG. 6A with the second image G2 illustrated in FIG. 6B additionally formed thereon. Note that according to the present embodiment, the reverse surface of the first recorded sheet S11 also has an image formed thereon.

As illustrated in FIG. 7, the recording surface SR of the first recorded sheet S11 includes the first image G1 and the second image G2. The second image G2 is formed so as not to overlap with the first image G1. The second image G2 is also formed so as to be upside down relative to the first image G1.

Figure 8:
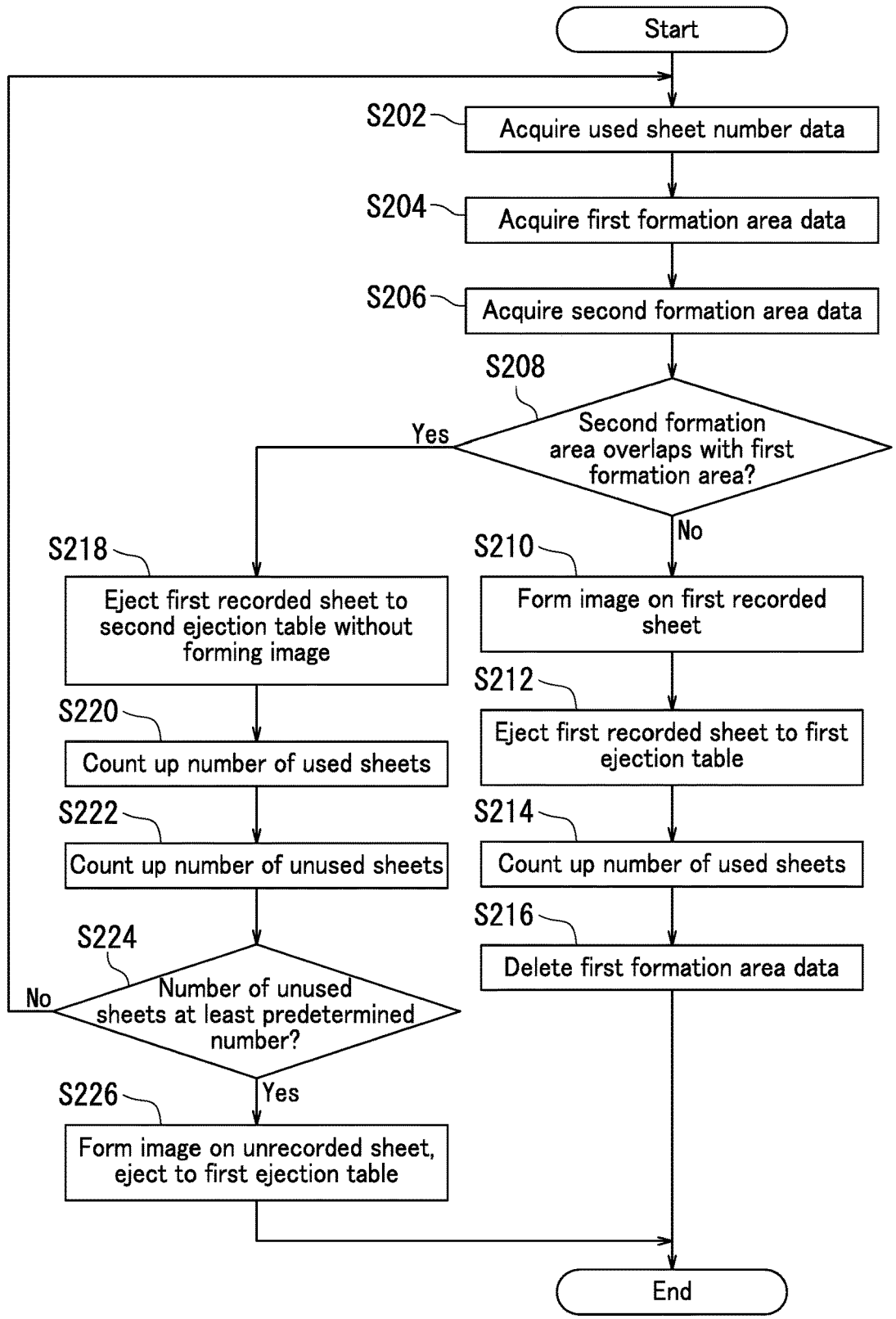
FIG. 8 is a flowchart illustrating an image formation process according to the first embodiment of the present disclosure.
Figure 9:
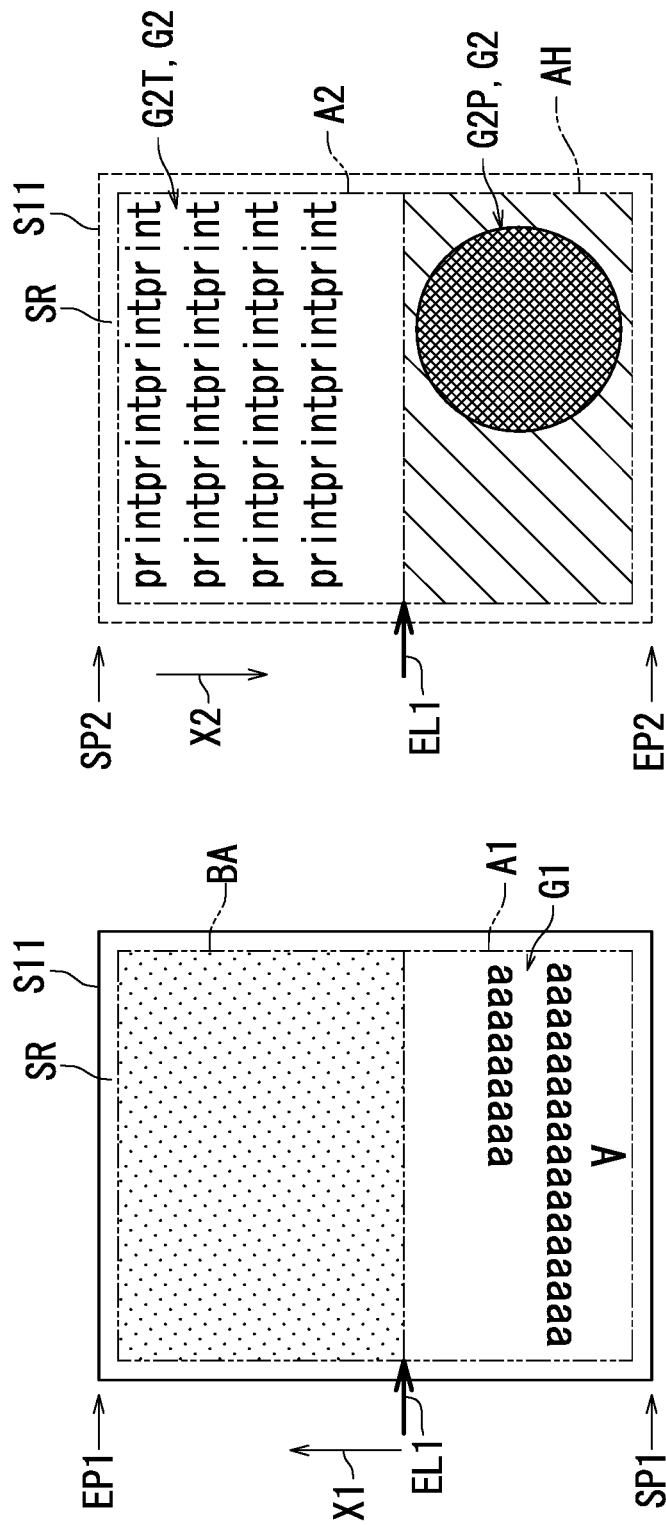
FIG. 9A is a diagram illustrating the recording surface of the first recorded sheet illustrated in FIG. 6A.
FIG. 9B is a diagram illustrating an example of a second image according to a second embodiment of the present disclosure.

Next, the image formation process according to the first embodiment will be described with reference to FIGS. 1 to 3 and 6A to 8. FIG. 8 is a flowchart illustrating the image formation process according to the first embodiment. The image formation process illustrated in FIG. 8 is started when the printing mode instruction during the execution of the printing function indicates that an image is to be formed on both sides of a sheet S and the sheet assortment instruction indicates that a recorded sheet S1 is to be used.

As illustrated in FIG. 8, the controller 11 acquires the used sheet number data 10b from the storage 10 (Step S202). Next, the controller 11 acquires the reading order data 10a corresponding to the used sheet number data 10b. The controller 11 also acquires the first formation area data associated with the acquired reading order data 10a (Step S204). In detail, the controller 11 acquires the reading order data 10a matching a value obtained by increasing the value indicated by the used sheet number data 10b by "1".

Continuing, the controller 11 acquires the second formation area data (Step S206). Next, the controller 11 executes the comparison process. In detail, the controller 11 determines whether or not the second formation area A2 overlaps with the first formation area A1 (Step S208). When the controller 11 has determined that the second formation area A2 does not overlap with the first formation area A1 (Step S208: No), the controller 11 directs the sheet feed section 5 to feed a first recorded sheet S11 from the first cassette 51a. As a result, an image is formed on both sides of the first recorded sheet S11 (Step S210). The first recorded sheet S11 with the image formed thereon is ejected to the first ejection table 812 through the first main body exit port H1 (Step S212). Next, the controller 11 updates the used sheet number data 10b by counting up the number of used sheets (Step S214). Continuing, the controller 11 deletes the first formation area data corresponding to the first recorded sheet S11 with the image formed thereon from the storage 10 (Step S216), and the image formation process ends.

When the controller 11 has determined that the second formation area A2 overlaps with the first formation area A1 by contrast (Step S208: Yes), the controller 11 directs the sheet feed section 5 to feed the first recorded sheet S11 from the first cassette 51a. The fed first recorded sheet S11 is ejected to the second ejection table 822 through the second main body exit port H2 without an image formed thereon (Step S218). Next, the controller 11 counts up the number of used sheets (Step S220) and counts up the number of unused sheets (Step S222). The number of unused sheets is the number of first recorded sheets S11 that have been ejected to the second ejection table 822 without an image formed thereon. Data indicating the number of unused sheets is stored in the storage 10.

Next, the controller 11 determines whether or not the number of unused sheets is equal to or greater than a predetermined number of sheets (Step S224). The predetermined number of sheets can be set by the user as appropriate. The predetermined number of sheets is five, for example.

When the controller 11 has determined that the number of unused sheets is not equal to or greater than the predetermined number of sheets (Step S224: No), the image formation process returns to Step S202. When the controller 11 has determined that the number of unused sheets is equal to or greater than the predetermined number of sheets by contrast (Step S224: Yes), the controller 11 feeds an unrecorded sheet S2 from the second cassette 51b. As a result, the unrecorded sheet S2 with an image formed on both sides thereof is ejected to the first ejection table 812 (Step S226) and the image formation process ends.

Note that the order in which each process of Steps S202 to S226 is executed is not limited to the order illustrated in FIG. 8. For example, the process of Step S206 may be executed before the process of Step S202.

The controller 11 can also omit the process of Steps S222 and S224. That is, an image may be formed on an unrecorded sheet S2 whenever the controller 11 has determined that the second formation area A2 overlaps with the first formation area A1 (Step S208: Yes). In such a configuration, the time of the image formation process can be shortened.

The first embodiment of the present disclosure is described above. According to the present embodiment, the second image G2 can be additionally formed on a recording surface SR on Which the first image G1 is previously formed. As a result, sheets S can be saved.

Also according to the present embodiment, the second image G2 is formed on the recording surface SR so as to be upside down relative to the first image G1. Therefore, the user can easily visually confirm the boundary of the first image G1 and the second image G2. As a result, readability can be ensured.

According to the present embodiment, the reading apparatus 4 reads the first image G1 formed on the recording surface SR of a recorded sheet S1 conveyed by the document feeder 3. However, the reading apparatus 4 may read the first image G1 formed on the recording surface SR of a recorded sheet S1 placed on the contact glass 41, for example. As such, whether the read recorded sheet S1 is a first recorded sheet S11 or a second recorded sheet S12 is displayed on the touch panel 22, for example. The user can sort the recorded sheets S1 based on the information displayed on the touch panel 22.

Also according to the present embodiment, the controller 11 acquires the first formation area data of the recorded sheets S1 on which the first formation area A1 is contained within the predetermined range T in the image reading process during the execution of the sorting function. However, the controller 11 may acquire the first formation area data of all of the recorded sheets S1. That is, the controller 11 may omit the process of determining whether or not the first formation area A1 is contained within the predetermined range T. Therefore, a processing load of the controller 11 can be reduced. The time of the image reading process during the execution of the sorting function can also be shortened. When the process of determining whether or not the first formation area A1 is contained within the predetermined range T is omitted, all of the recorded sheets S1 are ejected to the first document ejection table 352. That is, the first diverging guide 37 need not switch the conveyance destination of the recorded sheets S1 between the first document ejection section 35 and the second document ejection section 36. Therefore, the second document ejection table 362 can be omitted from the document feeder 3.

Also according to the present embodiment, a first recorded sheet S11 is only fed when the printing mode instruction indicates that an image is to be formed on both sides of a sheet S. However, a first recorded sheet S11 may be fed when the printing mode instruction indicates that an image is to be formed on a single side of a sheet S. As such, the first recorded sheets S11 are housed in the first cassette 51a such that an image is to be formed on the recording surface SR. Therefore, another image can be additionally formed on the reverse surface of each first recorded sheet S11. As a result, sheets S can be saved.

Also according to the present embodiment, the sheet feed section 5 feeds a first recorded sheet S11 housed in the first cassette 51a. However, the sheet feed section 5 may feed a first recorded sheet S11 placed on a manual feed table.

Also according to the present embodiment, an example is described in which a plurality of first recorded sheets S11 is read by the reading apparatus 4. However, there may be only a single first recorded sheet S11.

Also according to the present embodiment, an example is described in which the image formation process is executed by the printing function. However, the image formation process may also be executed by the copy function. As such, the second image data is generated by the reading apparatus 4 reading the second image formed on a document. The document may be placed on the contact glass 41 or conveyed to the reading position R by the document conveyance section 33.

Second Embodiment

Next, a second embodiment of the present disclosure will be described with reference to FIGS. 2, 3, and 9 to 13. An image formation process in the second embodiment differs from the first embodiment. In the following, the points of difference between the first and second embodiments will be described, and description of elements that are shared with the first embodiment will be omitted.

According to the present embodiment, a second image G2 includes a character image and a picture image. Note that a picture image shows either or both of a drawing and a diagram.

The controller 11 further executes a picture determination process when it has been determined that a second formation area A2 overlaps with a first formation area A1 in the image formation process. In the picture determination process, the controller 11 determines whether or not the second image G2 includes a picture image. The controller 11 determines whether or not only the picture image is to be formed in the overlapping area when the controller 11 has determined that the second image G2 includes a picture image. The overlapping area is where a first image G1 and the second image G2 overlap. The controller 11 determines whether or not to form the second image G2 on a recording surface SR of a first recorded sheet S11 based on the result of the picture determination process.

FIG. 9A is a diagram illustrating the recording surface SR of a first recorded sheet S11. FIG. 9B is a diagram illustrating an example of the second image G2 according to the second embodiment. In detail, FIG. 9A illustrates the uppermost first recorded sheet S11 among a plurality of recorded sheets S11 housed in the first cassette 51a. Note that the first recorded sheet S11 illustrated in FIG. 9A is the same as the first recorded sheet S11 illustrated in FIG. 6A. An area AH indicated by hatching in FIG. 9B is an overlapping area AH in which the first image G1 and the second image G2 overlap. Note that in FIG. 9B, the first recorded sheet S11 is illustrated with dotted lines to ease understanding.

As illustrated in FIG. 9B, the second image G2 includes a character image G2T and a picture image G2P (a circular shape). The character image G2T is formed between a second scan starting line SP2 and a first end point line EL1. The picture image G2P is formed between the first end point line EL1 and a second scan finish line EP2. That is, only the picture image G2P is formed in the overlapping area AH in the example illustrated in FIG. 9B.

Figure 10:
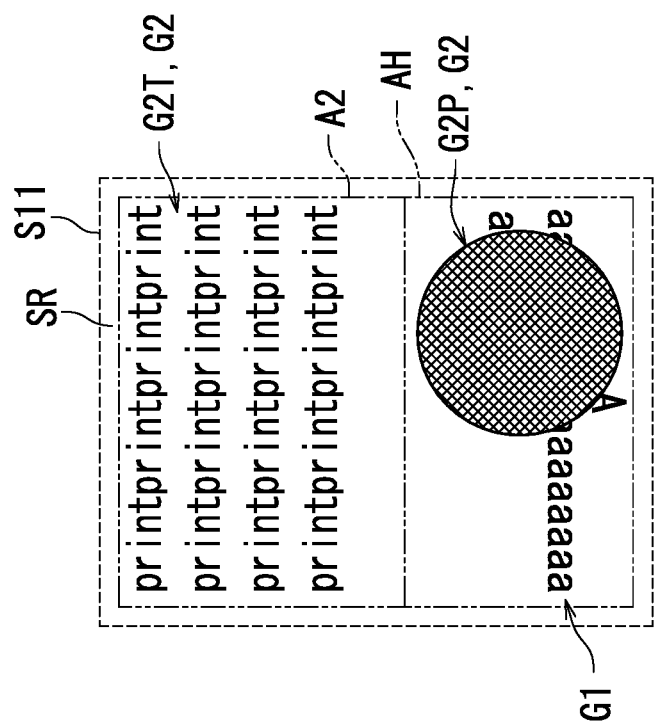
FIG. 10 is a diagram illustrating an example of a recording surface of a first recorded sheet with a second image formed thereon according to the second embodiment of the present disclosure.

FIG. 10 is a diagram illustrating an example of the recording surface SR of a first recorded sheet S11 with the second image G2 formed thereon according to the second embodiment. When the second image G2 illustrated in FIG. 9B is formed on the recording surface SR of the first recorded sheet S11 illustrated in FIG. 9A, only the picture image G2P overlaps with the first image G1 as illustrated in FIG. 10.

Figure 11:
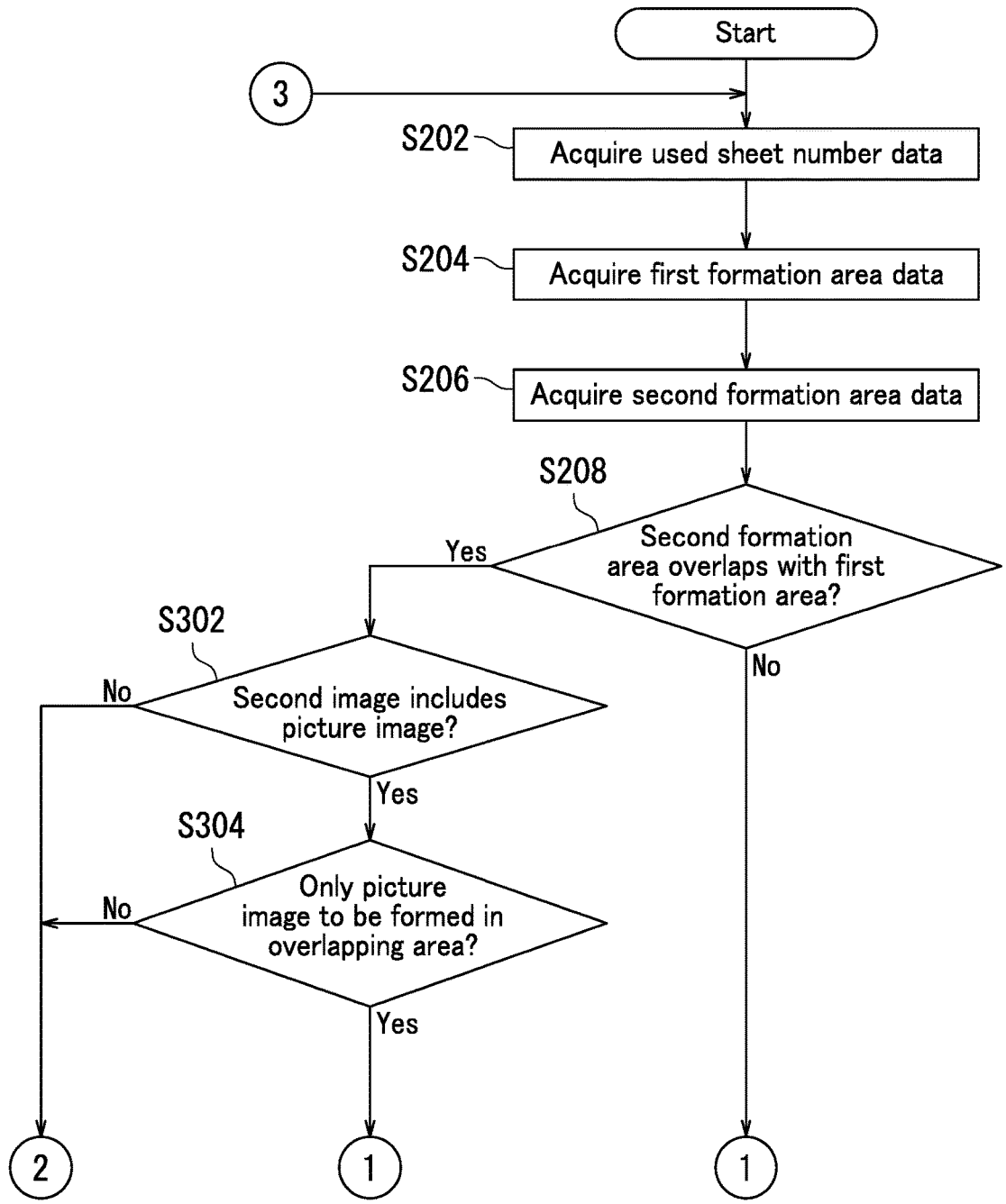
FIG. 11 is a flowchart illustrating an image formation process according to the second embodiment of the present disclosure.
Figure 12:
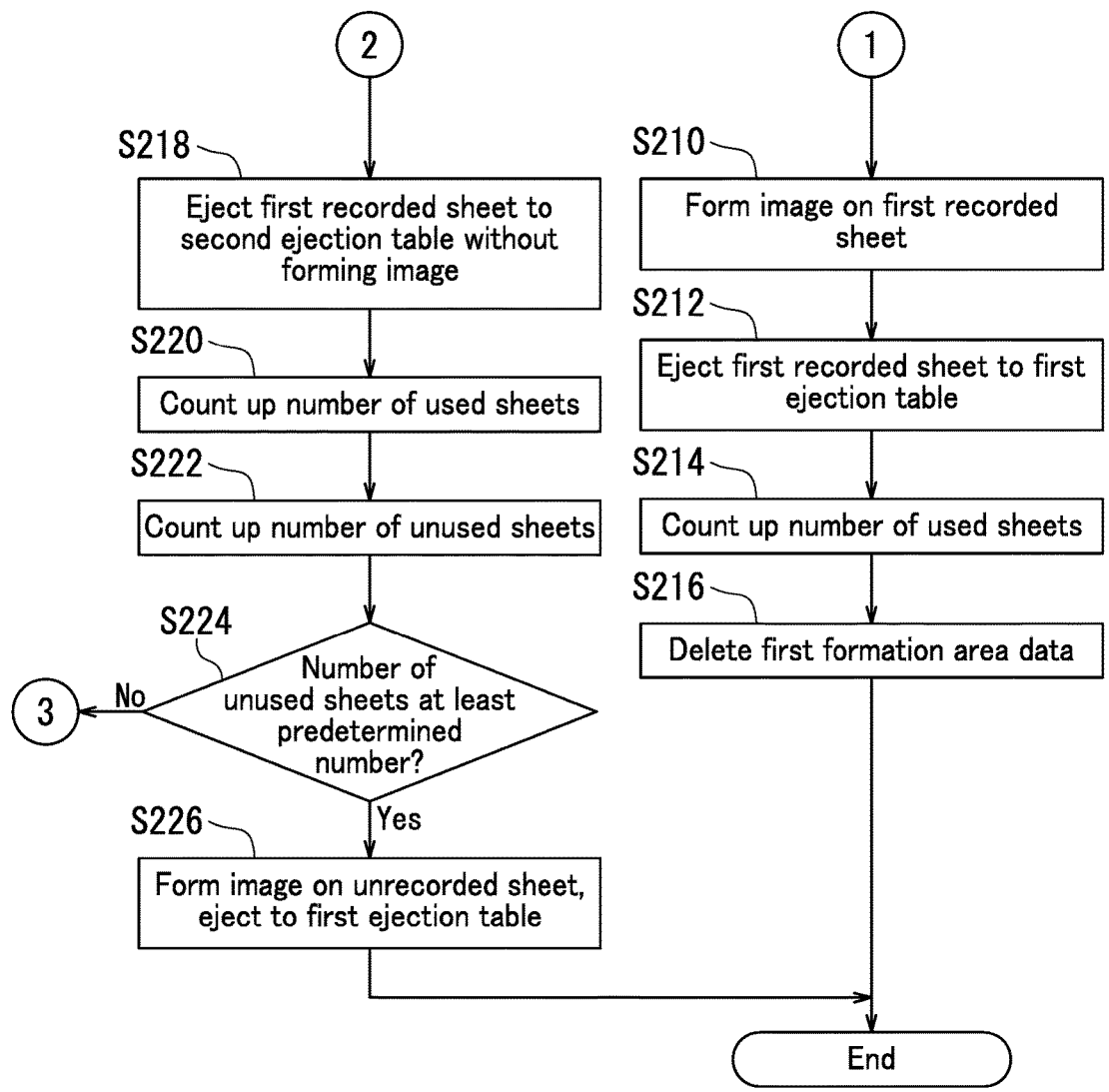
FIG. 12 is a flowchart illustrating the image formation process according to the second embodiment of the present disclosure.

FIGS. 11 and 12 are flowcharts illustrating the image formation process according to the second embodiment. As illustrated in FIG. 11, when the controller 11 has determined that the second formation area A2 overlaps with the first formation area A1 (Step S208: Yes), the controller 11 determines whether or not the second image G2 includes a picture image G2P (Step S302). When the controller 11 has determined that the second image G2 includes a picture image G2P (Step S302: Yes), the controller 11 determines whether or not only the picture image G2P is to be formed in the overlapping area AH (Step S304). When the controller 11 has determined that only the picture image G2P is to be formed in the overlapping area AH (Step S304: Yes), an image is formed on both sides of the uppermost first recorded sheet S11 in the first cassette 51a as illustrated in FIG. 12 (Step S210). The first recorded sheet S11 with the images formed thereon is ejected to the first ejection table 812 through the first main body exit port H1 (Step S212).

When the controller 11 has determined that the second image G2 does not include a picture image G2P (Step S302: No) or not only the picture image G2P is to be formed in the overlapping area AH by contrast (Step S304: No), the first recorded sheet S11 is ejected to the second ejection table 822 through the second main body exit port H2 without an image formed thereon as illustrated in FIG. 12 (Step S218).

The second embodiment of the present disclosure is described above. Generally, visibility tends not to decline even when a picture image is formed overlapping with character images. According to the present embodiment, the second image G2 is formed on the recording surface SR of a first recorded sheet S11 even when a portion of the second image G2 overlaps with the first image G1, when the controller 11 has determined that only the picture image G2P is to be formed overlapping the first image G1. Therefore, sheets S can be saved.

Note that when the controller 11 has determined that only the picture image G2P is to be formed in the overlapping area AH as a result of the picture determination process, the controller 11 may calculate picture density and determine whether or not the picture density is equal to or greater than a picture threshold. The picture threshold is a value set with respect to the picture density, and is prestored in the storage 10. The picture threshold is "0.5", for example.

The picture density is calculated based on the number of dots occupying a picture area in which the picture image is formed and the number of dots composing the picture image. In the following, the number of dots occupying the picture area will be referred to as a "picture area dot count" and the number of dots composing the picture image will be referred to as a "picture image dot count". The picture density is a ratio of the picture image dot count to the picture area dot count. The picture area may be a rectangular-shaped area circumscribing the picture image or may be an area defined by the edges of the picture image.

Information indicating the picture area is included in second image data when the second image data is received through the communication section 9. Accordingly, the controller 11 acquires the information indicating the picture area included in the second image data when the second image data has been acquired and calculates the picture density. Also, when the reading apparatus 4 generates the second image data, the information indicating the picture area is acquired by the OCR function, for example.

Figure 13:
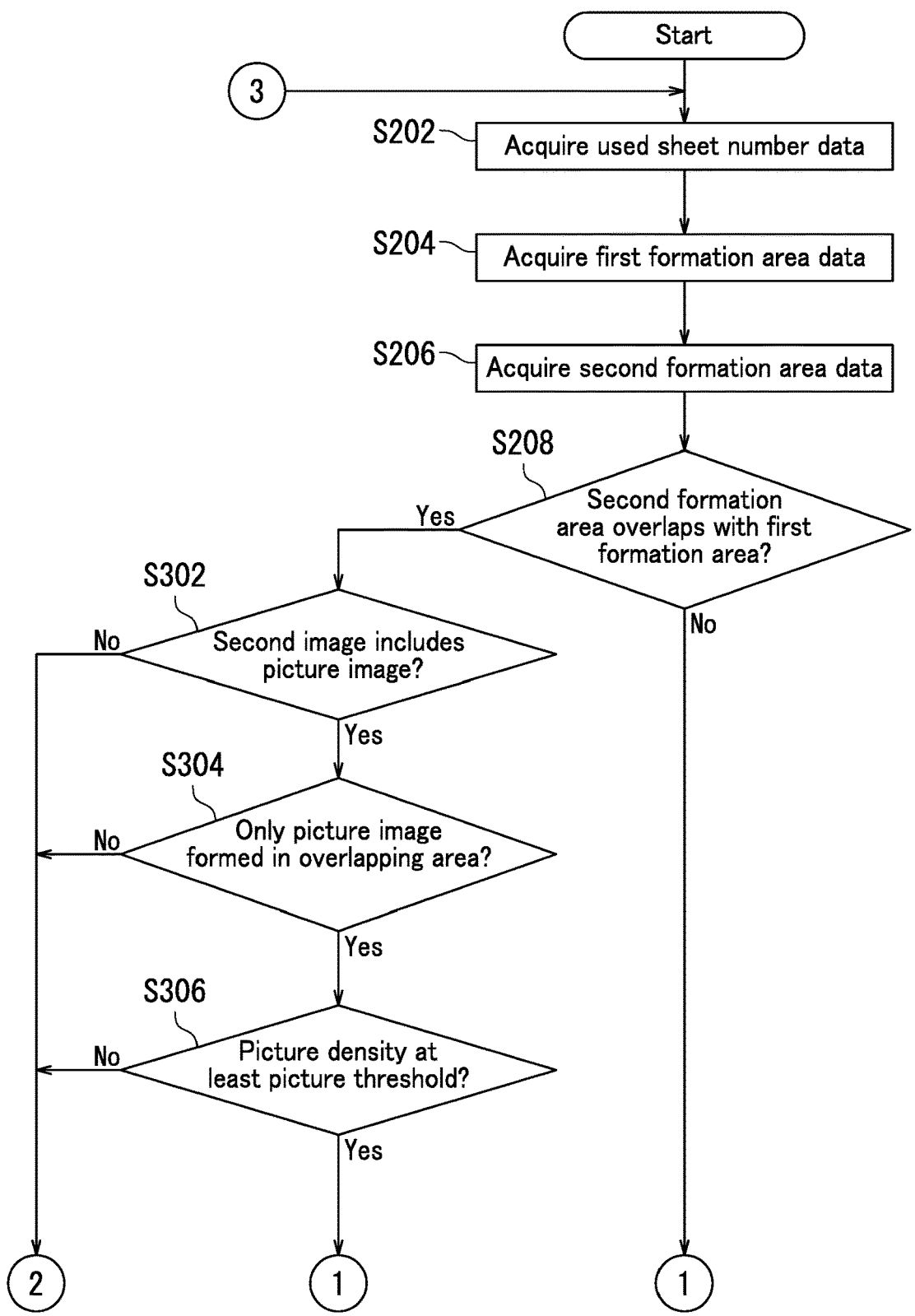
FIG. 13 is a flowchart illustrating a variation of the image formation process according to the second embodiment of the present disclosure.

FIG. 13 is a flowchart illustrating a variation of the image formation process according to the second embodiment. As illustrated in FIG. 13, when the controller 11 has determined that only the picture image G2P is to be formed in the overlapping area AH (Step S304: Yes), the controller 11 determines whether or not the picture density is equal to or greater than the picture threshold (Step S306). When the controller 11 has determined that the picture density is equal to or greater than e picture threshold (Step S306: Yes), the image formation process advances to Step S210 described with reference to FIG. 12.

When the controller 11 has determined that the picture density is not equal to or greater than the picture threshold by contrast (Step S306: No), the image formation process advances to Step S218 described with reference to FIG. 12. As above, the picture image G2P is formed overlapping the first image G1 only when the picture density of the picture image G2P is equal to or greater than the picture threshold. Therefore, the visibility of the picture image G2P can be ensured.

Third Embodiment

Next, a third embodiment of the present disclosure will be described with reference to FIGS. 14 and 15. The third embodiment differs from the first and second embodiments in that an image forming apparatus and a reading apparatus are separate devices. In the following, the points of difference between the third embodiment and the first and second embodiments will be described, and description of elements that are shared with the first and second embodiments will be omitted.

Figure 14:
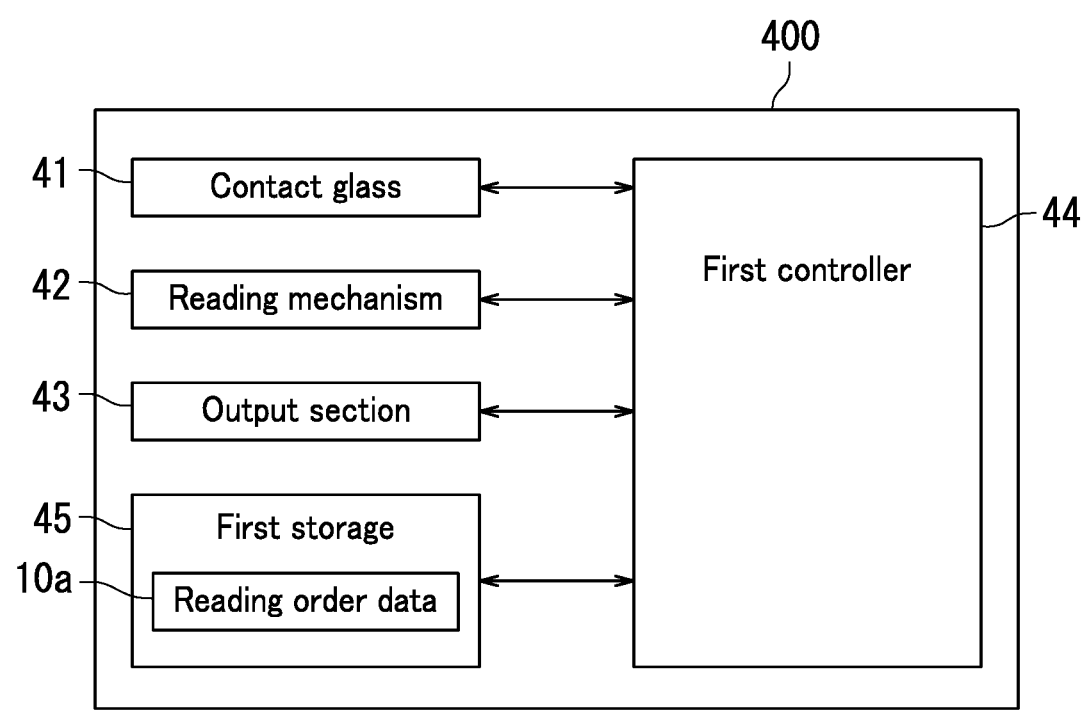
FIG. 14 is a block diagram illustrating a configuration of a reading apparatus according to a third embodiment of the present disclosure.

FIG. 14 is a block diagram illustrating a configuration of a reading apparatus 400 according to the third embodiment. As illustrated in FIG. 14, the reading apparatus 400 includes an output section 43, a first controller 44, and first storage 45 in addition to contact glass 41 and a reading mechanism 42. The reading apparatus 400 is a scanner, for example.

Example components of the first controller 44 include a CPU. The first controller 44 receives data and signals from each section of the reading apparatus 400. The first controller 44 also controls operation of each section of the reading apparatus 400 by executing a control program stored in the first storage 45.

The first storage 45 includes a storage medium such as an HDD, RAM, or ROM.

The reading apparatus 400 according to the third embodiment executes a sorting function similar to the first and second embodiments. Therefore, the first controller 44 generates first image data based on a signal outputted from an image sensor. The generated first image data is stored in the first storage 45 in association with reading order data 10a.

The output section 43 is an interface used to connect to an external device. According to the present embodiment, the output section 43 is a Universal Serial Bus (USB) port. The first controller 44 stores the first image data and the reading order data 10a stored in the first storage 45 in USB memory when the USB memory is connected (attached) to the output section 43.

Figure 15:
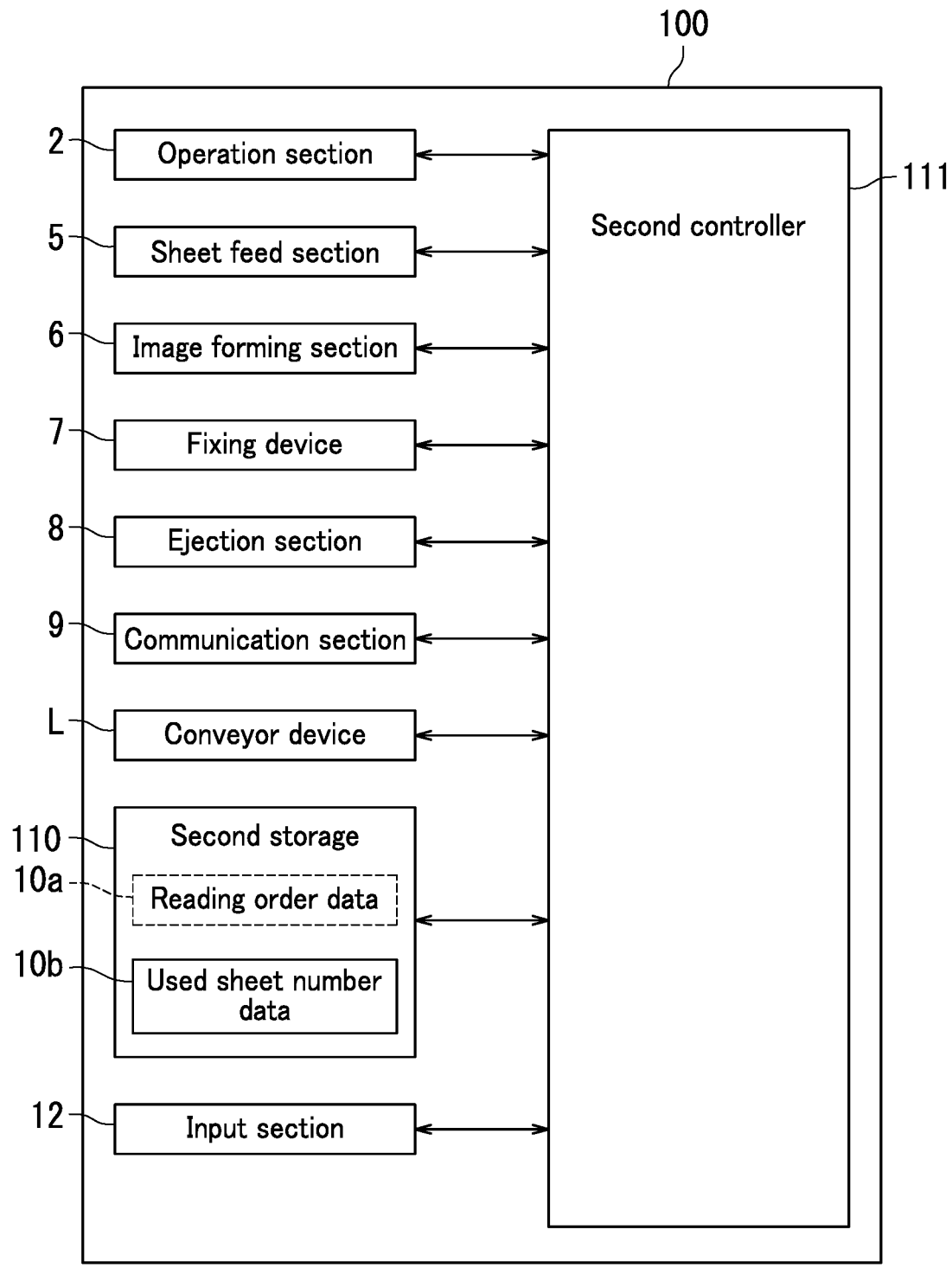
FIG. 15 is a block diagram illustrating the configuration of an image forming apparatus according to the third embodiment of the present disclosure.

FIG. 15 is a block diagram illustrating a configuration of an image forming apparatus 100 according to the third embodiment. According to the present embodiment, the image forming apparatus 100 is a printer. As illustrated in FIG. 15, the image forming apparatus 100 includes an operation section 2, a sheet feed section 5, an image forming section 6, a fixing device 7, an ejection section 8, a communication section 9, a conveyor device L, second storage 110, a second controller 111, and an input section 12.

The second storage 110 includes a storage medium such as an HDD, RAM, or ROM. The second storage 110 stores a control program for controlling operation of each section of the image forming apparatus 100. The second storage 110 also stores used sheet number data 10b similarly to the first and second embodiments.

Example components of the second controller 111 include a CPU and an ASIC. The controller 11 receives data and signals from each section of the image forming apparatus 100. The controller 11 also controls operation of each section of the image forming apparatus 100 by executing the control program.

The input section 12 is an interface able to communicate data using the same method as the output section 43. According to the present embodiment, the input section 12 is a USB port. When the USB memory storing the first image data and the reading order data 10a is connected (attached) to the input section 12, the first image data and the reading order data 10a stored in the USB memory are inputted to the image forming apparatus 100 (second controller 111). The inputted first image data and reading order data 10a are stored in the second storage 110.

The image forming apparatus 100 according to the third embodiment executes an image formation process similarly to the first and second embodiments. For example, the image forming apparatus 100 according to the third embodiment executes the image formation process following the flow illustrated in FIG. 8.

The third embodiment is described above. According to the present embodiment, sheets S can be saved similarly to the first and second embodiments.

Note that the reading apparatus 400 may further include the document feeder 3 described in the first embodiment.

Also in the present embodiment, an example is described in which the first image data and the reading order data 10a are inputted to the image forming apparatus 100 through a USB port. However, the first image data and the reading order data 10a may be inputted to the image forming apparatus 100 through a network such as a LAN, for example. As such, the reading apparatus 400 further includes a network interface able to communicate data using the same method as the communication section 9, and the output section 43 may be omitted. The input section 12 may also be omitted from the image forming apparatus 100.

Embodiments of the present disclosure are described above with reference to the drawings (FIGS. 1 to 15). However, the present disclosure is not limited to the above embodiments, and may be implemented in various different forms within a scope not departing from the essence of thereof.

For example, according to the embodiments of the present disclosure, the image forming apparatus forms images electrographically. However, the image forming apparatus may form images using an inkjet method, for example.

What is claimed is:

1. An image forming apparatus, comprising:
a reading apparatus configured to read a first image previously formed on a recording surface of a sheet to generate first image data indicating the first image;
a processor configured to acquire first formation area data based on the first image data, the first formation area data indicating a range of a first formation area in which the first image is formed; and
an image forming section configured to form a second image on the recording surface based on second image data indicating the second image, wherein
the processor acquires second formation area data based on the second image data, the second formation area data indicating a range of a second formation area in which the second image is to be formed,
the processor determines whether or not the second formation area overlaps with the first formation area based on the first formation area data and the second formation area data, and
the processor
directs the image forming section to form the second image on the recording surface when the second formation area is determined not to overlap with the first formation area, and
does not direct the image forming section to form the second image on the recording surface when the second formation area is determined to overlap with the first formation area.

2. The image forming apparatus according to claim 1, further comprising
storage configured to store data, wherein
the processor determines whether or not the range of the first formation area is contained within a predetermined range,
the processor
stores the first formation area data in the storage when the range of the first formation area is determined to be contained within the predetermined range, and
does not store the first formation area data in the storage when the range of the first formation area is determined not to be contained within the predetermined range, and
the processor determines whether or not the second formation area overlaps with the first formation area based on the first formation area data stored in the storage and the second formation area data.

3. The image forming apparatus according to claim 2, further comprising
a document feeder configured to convey the sheet to a reading position in which the first image is readable by the reading apparatus, wherein
the document feeder comprises:
a casing; and
an ejection section configured to eject the sheet from the casing, and
the processor directs the ejection section to sort one or more sheets on which the range of the first formation area is determined to be contained within the predetermined range from one or more sheets on which the range of the first formation area is determined not to be contained within the predetermined range.

4. An image forming apparatus, comprising:
a reading apparatus configured to read a first image previously formed on a recording surface of a sheet to generate first image data indicating the first image;
a processor configured to acquire first formation area data based on the first image data, the first formation area data indicating a range of a first formation area in which the first image is formed; and
an image forming section configured to form a second image on the recording surface based on second image data indicating the second image, wherein
the second image includes a character image and a picture image,
the processor acquires second formation area data based on the second image data, the second formation area data indicating a range of a second formation area in which the second image is to be formed,
the processor determines whether or not the second formation area overlaps with the first formation area based on the first formation area data and the second formation area data,
the processor
directs the image forming section to form the second image on the recording surface when the second formation area is determined not to overlap with the first formation area, and determines whether only the picture image is to be formed in an overlapping area in which the second formation area and the first formation area overlap when the second formation area is determined to overlap with the first formation area, and the processor directs the image forming section to form the second image on the recording surface when only the picture image is determined to be formed in the overlapping area, and does not direct the image forming section to form the second image on the recording surface when not only the picture image is determined to be formed in the overlapping area.

5. The image forming apparatus according to claim 4, wherein the processor calculates a picture density when the picture image is determined to be formed in the overlapping area, the picture density indicating a ratio of the number of dots composing the picture image to the number of dots occupying an area in which the picture image is to be formed, the processor determines whether or not the picture density is equal to or greater than a threshold, and the processor directs the image forming section to form the second image on the recording surface when the picture density is determined to be equal to or greater than the threshold, and does not direct the image forming section to form the second image on the recording surface when the picture density is determined not to be equal to or greater than the threshold.

6. A reading apparatus, comprising:

a casing;

a reading mechanism configured to read an image previously formed on a recording surface of a sheet to generate image data indicating the image;

an ejection section configured to eject the sheet from which the image has been read from the casing; and a processor configured to acquire formation area data based on the image data, the formation area data indicating a range of a formation area in which the image is formed, wherein the processor determines whether or not the range of the formation area is contained within a predetermined range based on the formation area data, and directs the ejection section to sort one or more sheets on which the range of the formation area is determined to be contained within the predetermined range from one or more sheets on which the range of the formation area is determined not to be contained within the predetermined range.

7. The reading apparatus according to claim 6, further comprising storage configured to store data, wherein the processor stores the formation area data in the storage when the range of the formation area is determined to be contained within the predetermined range, and does not store the formation area data in the storage when the range of the formation area is determined not to be contained within the predetermined range.

8. An image forming apparatus, comprising:

an image forming section configured to form a second image on a sheet on which a first image is previously formed on a recording surface thereof, and form the second image on the recording surface based on second image data indicating the second image;

an input section configured to receive input of first formation area data indicating a range of a first formation area in which the first image is formed; and a processor configured to acquire the first formation area data through the input section, wherein the processor acquires second formation area data based on the second image data, the second formation area data indicating a range of a second formation area in which the second image is to be formed, the processor determines whether or not the second formation area overlaps with the first formation area based on the first formation area data and the second formation area data, and the processor directs the image forming section to form the second image on the recording surface when the second formation area is determined not to overlap with the first formation area, and does not direct the image forming section to form the second image on the recording surface when the second formation area is determined to overlap with the first formation area.

* * * * *